United States Patent [19]

Yoshida

[11] Patent Number: 5,640,628
[45] Date of Patent: Jun. 17, 1997

[54] PHOTOGRAPHIC CAMERA

[75] Inventor: Yutaka Yoshida, Saitama-ken, Japan

[73] Assignee: Fuji Photo Film Co., Ltd., Kanagawa, Japan

[21] Appl. No.: 514,095

[22] Filed: Aug. 11, 1995

[30] Foreign Application Priority Data

Aug. 31, 1994 [JP] Japan .................................. 6-207005
Sep. 1, 1994 [JP] Japan .................................. 6-208761

[51] Int. Cl.⁶ .................................................. G03B 17/24
[52] U.S. Cl. ........................................ 396/311; 396/535
[58] Field of Search ........................... 348/208; 354/413,
354/419, 126, 149.11, 400, 430, 202, 195.12,
70, 105, 106; 396/311, 535

[56] References Cited

U.S. PATENT DOCUMENTS 4,973,996  11/1990  Harvey .
5,084,724   1/1992  Maeno ........................................ 354/430
5,210,560   5/1993  Labaziewicz ............................ 354/268
5,461,439  10/1995  Minakuti et al. ........................ 354/106

*Primary Examiner*—Safet Metjahic
*Assistant Examiner*—Daniel Chapik
*Attorney, Agent, or Firm*—Sughrue, Mion, Zinn, Macpeak & Seas

[57] ABSTRACT

A photographic camera has a recording system which records an instruction on printing of each exposure frame of a photographic film in a predetermined area of a film. That a photographer's finger was resting on a strobe window of the camera during exposure of a frame under strobe light is detected, and when it is detected, the recording system records an instruction on printing of the exposed frame taking into account the fact that the frame was exposed under strobe light with a photographer's finger resting on the strobe window.

10 Claims, 17 Drawing Sheets

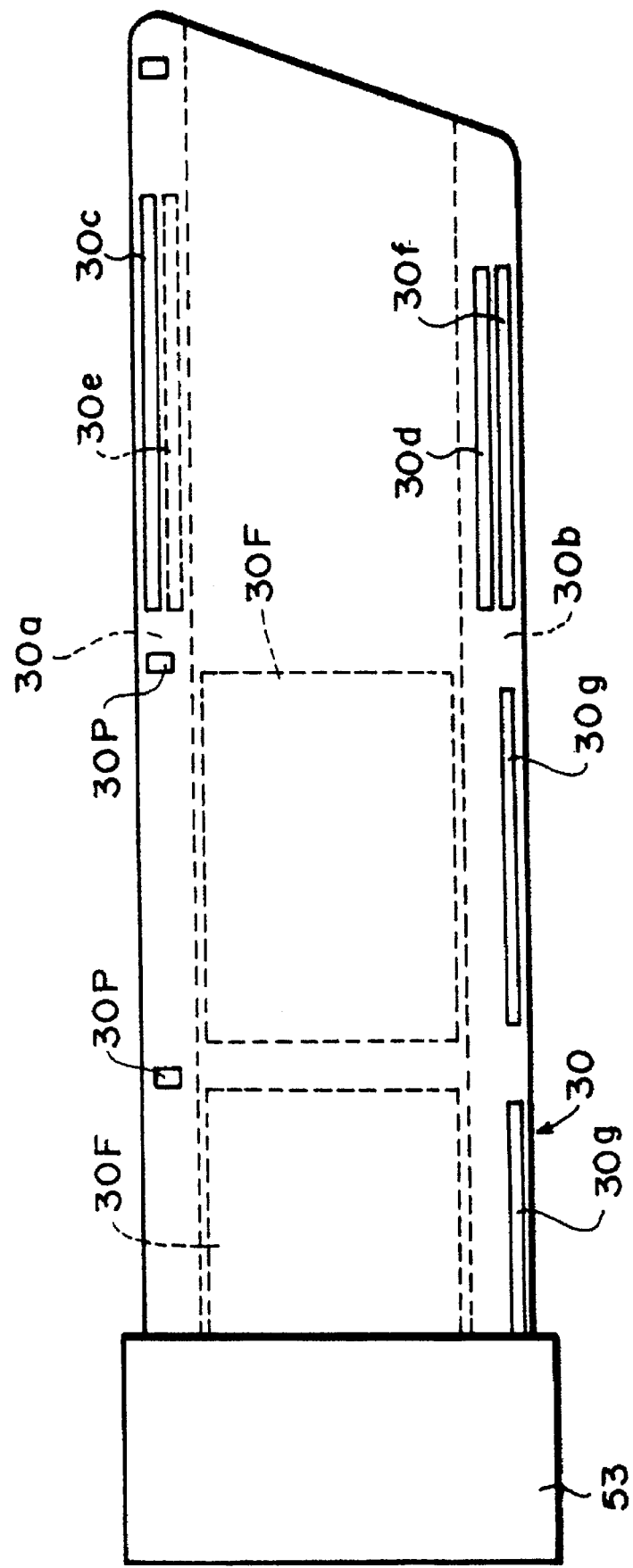

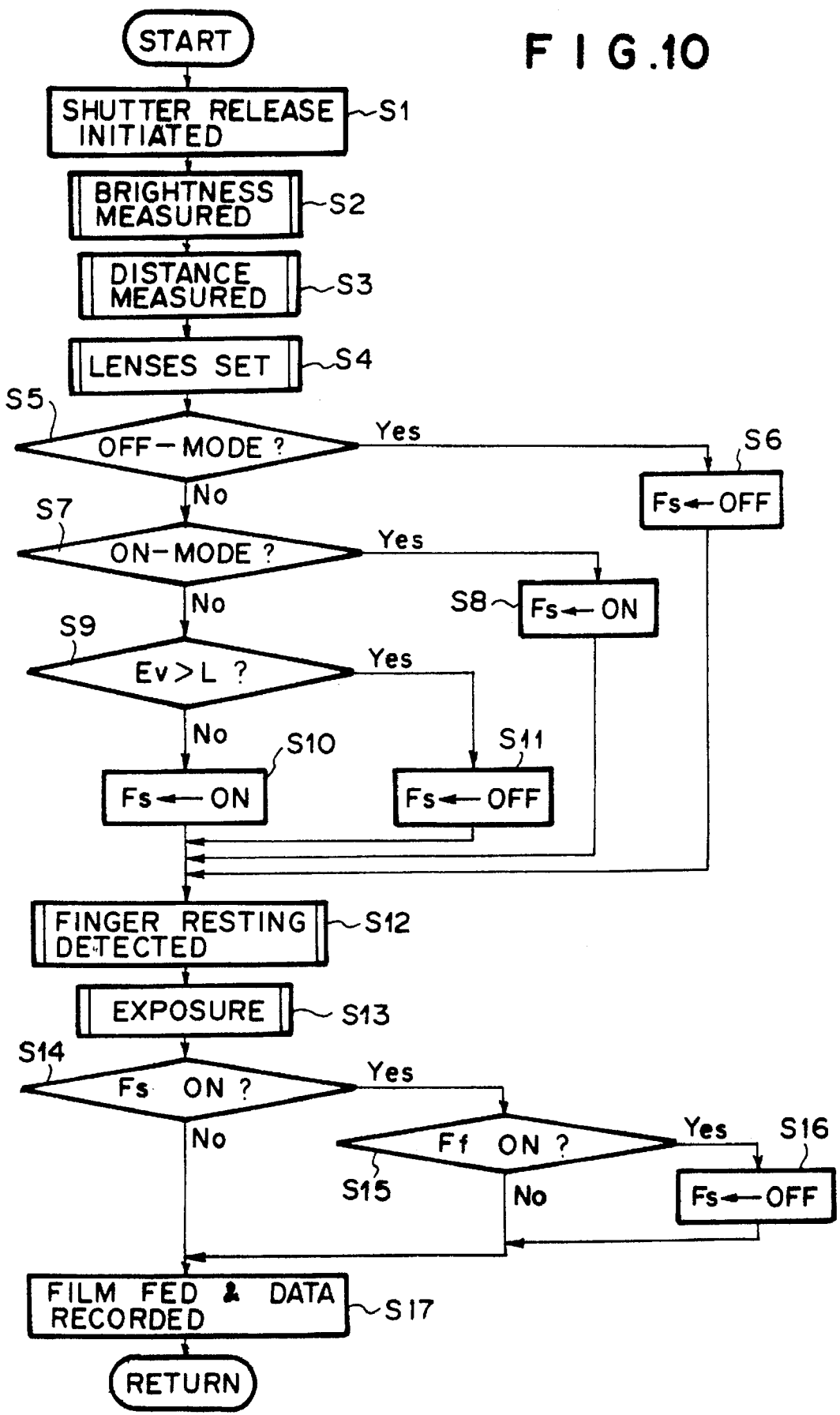

PHOTOGRAPHIC CAMERA

BACKGROUND OF THE INVENTION

1. Field of the Invention

This invention relates to a novel photographic camera which records predetermined information on a photographic film loaded therein.

2. Description of the Related Art

It has been proposed to form an information recording area, such as a magnetic recording layer, in part of a photographic film, and to record information on each exposure frame, e.g., data on the condition of exposure upon taking the picture, in the recording area, thereby facilitating development and/or printing in a processing laboratory or the like. See, for instance, U.S. Pat. No. 4,965,627, Japanese National-Publication-of-translated-version No. 4(1992)-502518, Japanese Patent Application No. 5(1993)0322393. For example, the brightness of the object, the position of the camera, the distance to the object, the print format (full size or panoramic size), whether the frame is to be printed, whether a strobe light is operated, and the like may be recorded.

A recent photographic camera is generally provided with an automatic exposure control system and/or an automatic focusing system; accordingly, there are fewer pictures defective due to underexposure, overexposure or failure in focusing. However, there are still many defective pictures due to accidental blockage of a strobe window with a finger, or due to an unintentional movement of the camera or the hands in taking a picture.

For example, a picture taken with the strobe window blocked with the photographer's finger is underexposed as compared with a picture taken with the strobe light properly operated. However, in such a camera, data informing that the strobe light was operated is recorded in the recording area irrespective of whether or not the strobe window was blocked in taking the picture. Accordingly, in a laboratory, the frame is processed regarding that the strobe light was properly operated, which results in a defective print.

In order to overcome this problem, we have proposed to provide a touch sensor in the vicinity of the strobe window and to electrically to detect that a finger of the photographer rests on the strobe window (that the strobe window is blocked with a finger) due to improper grip. (Japanese Unexamined Patent Publication No. 6(1994)10064) In a camera provided with such a touch sensor, when it is detected that the strobe window is blocked with a finger, an LED, buzzer, or the like alarms the photographer. The photographer sometimes can take the same picture.

However, in the case of a quickly moving object, it is difficult to take the same picture. For example, when taking pictures of sports, momentary shutter release opportunities are very important, and there is little possibility of retaking the same composition.

Accordingly, it is preferred that the frame taken at a good shutter release opportunity can be printed in such a density as to permit the image of the object to be recognized, even if the frame was taken under improper operation of the strobe light and a good image quality cannot be expected.

Further, when the exposure time is long, defective pictures due to an unintentional movement of the camera or the hands in taking a picture becomes more apt to occur. Especially when the exposure time is longer than 1/60 second, the problem of defective pictures due to an unintentional movement of the camera becomes more serious. This tendency is especially apt to occur in a compact camera for amateurs. In many of automatic exposure control cameras, the lens opening and the exposure time are automatically set, according to the brightness of the object, in a programmed fashion. However, since the photographer generally handles the camera in the same way without taking into account the difference in the exposure time due to the difference in the brightness of the object, the picture is apt to be blurred due to an unintentional movement of the camera or the hands. Such a blurred picture basically need not be printed.

When the camera is provided with a print command inputting means for inputting information on whether the frame is to be printed, or on the number of prints required, and the photographer can record on the film that the frame need not be printed when he recognizes that the camera was moved to blur the picture, printing of blurred pictures due to an unintentional movement of the camera or the hands (will be simply referred to as "blurred picture", hereafter) can be prevented and the photographer can be relieved of a wasted of printing charge. That is, when the photographer recognizes that the camera was moved to blur the picture, he operates the print command inputting means to record on the film that the frame need not be printed (in the case of a print command inputting means for inputting information on the number of prints required, to record that the number of prints required is 0); and the record is read in the laboratory and printing of the frame is prevented.

However, when the camera is not provided with such a manual print command inputting means, even blurred pictures are printed and the photographer must pay an unnecessary printing charge.

Thus, there is a demand for a photographic camera in which the fact that a frame need not be printed can be automatically recorded on a film when the camera is moved to blur the picture.

However, the photographer sometimes wants to print even a blurred picture, for instance, when he could not retake the picture.

SUMMARY OF THE INVENTION

In view of the foregoing observations and description, the primary object of the present invention is to provide a photographic camera which can record such data as to permit the printing in proper density, even of a frame exposed with the strobe window blocked by a photographer's finger.

Another object of the present invention is to provide a photographic camera in which data informing that a frame need not be printed can be automatically recorded on a film when the camera is moved to blur the picture.

Still another object of the present invention is to provide a photographic camera in which data informing that a frame need not be printed can be automatically recorded on a film when the camera is moved to blur the picture and, at the same time, the data informing that a frame need not be printed can be automatically rewritten to data informing that the frame is to be printed when the next frame is not a retake frame of the preceding frame, i.e., a frame in which the same object is taken in substantially the same composition as the preceding frame.

In accordance with a first aspect of the present invention, there is provided a photographic camera comprising a recording means which records an instruction on printing of each exposure frame of a photographic film in a predetermined area of the film, a finger resting detecting means which detects a photographer's finger resting on a strobe window of the camera during exposure of a frame under strobe light, and a recording control means which causes the recording means, upon receipt of a finger resting detecting signal from the finger resting detecting means, to record an instruction on printing of the exposed frame taking into account the fact that the frame was exposed under strobe light with a photographer's finger resting on the strobe window.

When the recording control means receives a finger resting detecting signal from the finger resting detecting means, the recording means may record data representing that the strobe light was not properly operated during exposure of the frame or, in the case where data representing whether the strobe light was operated is recorded, the recording means may record the data representing that the strobe light was not operated instead of the data representing that the strobe light was operated.

In the former case, the operator in a laboratory can know a frame which was exposed under strobe light with a photographer's finger resting on the strobe window and the printing density for the frame can be properly set so that the object can be recognized.

In the latter case, the frame which was exposed under strobe light with a photographer's finger resting on the strobe window is considered to have been exposed without strobe light and can be printed in such density as to permit the object to be recognized.

When information that the frame was exposed under strobe light is recognized by a printer in a laboratory, a special exposure algorithm which prevents, for instance, the human face at a very short distance from being overexposed is generally employed. When information that the frame was exposed without strobe light is recognized, a normal algorithm is employed. In this case, when that brightness of the object is about Lv 2 to Lv 6 has been known from another piece of information (object brightness data), the color temperature of the image on the film may be measured and color correction may be effected, for instance, when it is recognized that the frame was exposed under light of a fluorescent light.

In accordance with a second aspect of the present invention, there is provided a photographic camera comprising a recording means which records on a photographic film information on whether each of exposure frames of the photographic film is to be printed or on the number of prints required, a blur detecting means which detects that the camera was moved to blur the picture during exposure of each frame, and a prompting means which prompts the recording means, upon receipt of a blur detecting signal from the blur detecting means, to record a print inhibition instruction for inhibiting printing of the frame.

The print inhibition instruction may be information which represents that the frame need not be printed, or information which represents that the number of prints required is 0.

In a preferred embodiment, the camera of the second aspect is further provided with a retake determining means which determines whether or not the next frame is a retake frame, of the preceding frame and a rewriting means which causes the recording means to rewrite the print inhibition instruction for the preceding frame to a print requirement instruction which requires printing of the frame when the retake determining means determines that the next frame is not a retake frame of the preceding frame.

The rewriting means may cause the recording means to rewrite the print inhibition instruction for the preceding frame to the print requirement instruction by acting on the recording means either directly or by way of the prompting means.

It is preferred, in view of simplicity of determination, to determine that the next frame is not a retake frame of the preceding frame when at least one of the following conditions, (1) to (6), is satisfied.

(1) The main switch of the camera was turned off after the blur detecting means detected that the camera was moved to blur the picture during exposure of one frame and before the next frame was exposed.

(2) The ratio of the distance to the object upon exposure of the blurred frame and the distance to the object upon exposure of the next frame is not smaller than a predetermined value or the difference therebetween is not smaller than a predetermined value.

(3) The ratio of the brightness of the object of the blurred frame and that of the object of the next frame is not smaller than a predetermined value or the difference therebetween is not smaller than a predetermined value.

(4) The time from the end of exposure of the blurred frame to the start of exposure of the next frame is not shorter than a predetermined time.

(5) The position of the camera at the time the blurred frame was exposed differs from that at the time the next frame was exposed or is to be exposed by an amount not smaller than a predetermined value. For example, the blurred frame was exposed with the camera held in the normal position, and the next frame was exposed or is to be exposed with the camera held sideways.

(6) The aspect ratio of the blurred frame differs from that of the next frame. For example, one of the frames is of a full size and the other is of a panoramic size.

A manual input means for manually inputting an instruction on whether each frame is to be printed, or on the number of prints required, may be provided so that the photographer himself can determine whether the frame is to be printed required or the number of prints separately from the prompting means.

Thus, in accordance with the second aspect of the present invention, a print inhibition instruction, for inhibiting printing of the frame, is recorded when the camera is moved to blur the picture during exposure, and accordingly, the frame provided with print inhibition instruction is not printed, whereby the photographer is relieved from paying an unnecessary printing charge.

When an alarm means such as an LED disposed, for instance, in a view finder, is provided to inform the photographer of the fact that the camera was moved to blur the picture during exposure, the photographer can retake the same object.

Even if the photographer knows that a frame is defective, it is sometimes impossible to retake the same object and, in such a case, it is preferred that even the defective frame be printed. Accordingly, in the aforesaid preferred embodiment, the rewriting means causes the recording means to rewrite the print inhibition instruction for the preceding frame to the print requirement instruction when the retake determining means determines that the next frame is not a retake frame of the preceding frame.

BRIEF DESCRIPTION OF THE DRAWINGS

FIG. 9 is a schematic view showing an example of a photographic film to be loaded in the camera, FIG. 10 is a flow chart for illustrating the operation of the camera.

DESCRIPTION OF THE PREFERRED EMBODIMENTS

Figure 1:
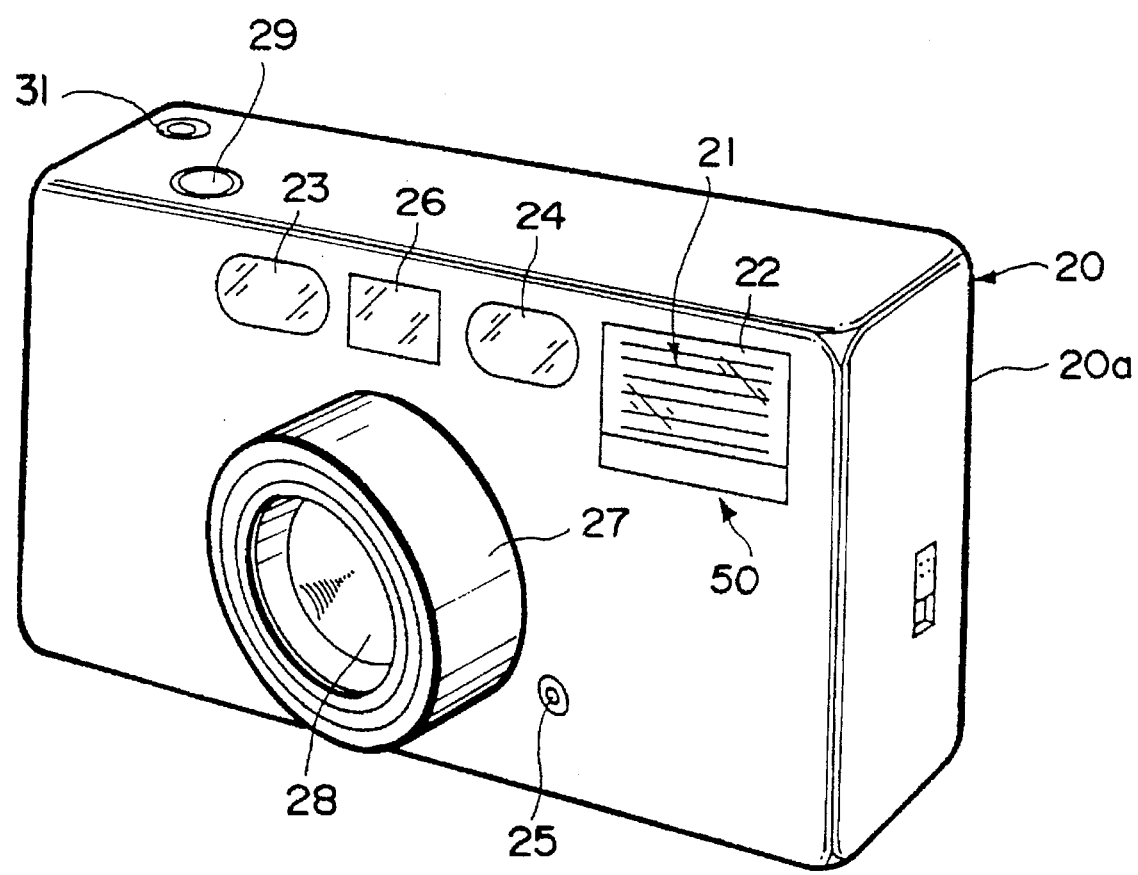
FIG. 1 is a perspective view showing a photographic camera in accordance with a first embodiment of the present invention.

In FIG. 1, a photographic camera 20 in accordance with a first embodiment of the present invention comprises a strobe light projecting system 21 having a window 20b (FIG. 4) covered with a diffusion plate 22, a light projecting window 23 and a light receiving window 24 for autofocusing, an exposure meter window 25 for measuring the brightness of an object, a viewfinder 26 and a taking lens system 28 held by a lens barrel 27. A shutter release button 29 and a main switch 31 for a power source are provided on the top surface of the camera 20. When the shutter release button 29 is pressed down halfway, the autofocusing system is actuated and when the shutter release button 29 is completely pressed down, a shutter (not shown) is released. The surface of the camera 20 is provided with a cover 20a of conductive material such as aluminum, titanium, nickel or the like.

Figure 3:
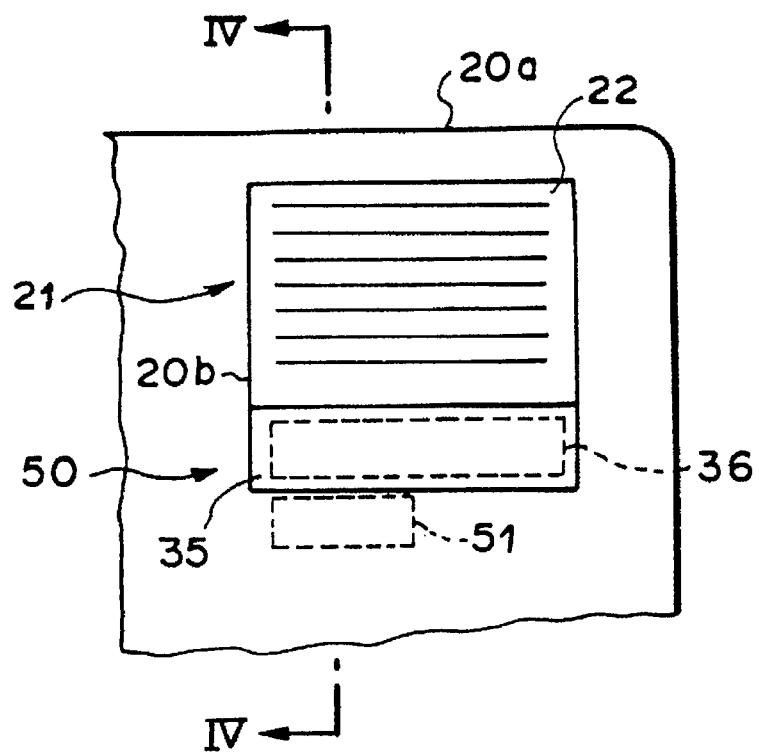
FIG. 3 is a fragmentary front view of the camera.

The strobe light projecting system 21 automatically projects strobe light toward an object when the brightness of the object measured through the exposure meter window 25 is low. As shown in FIG. 3, a touch sensor 50 four detecting touch of a finger or the like is disposed below the diffusion plate 22 adjacent thereto.

Figure 4:
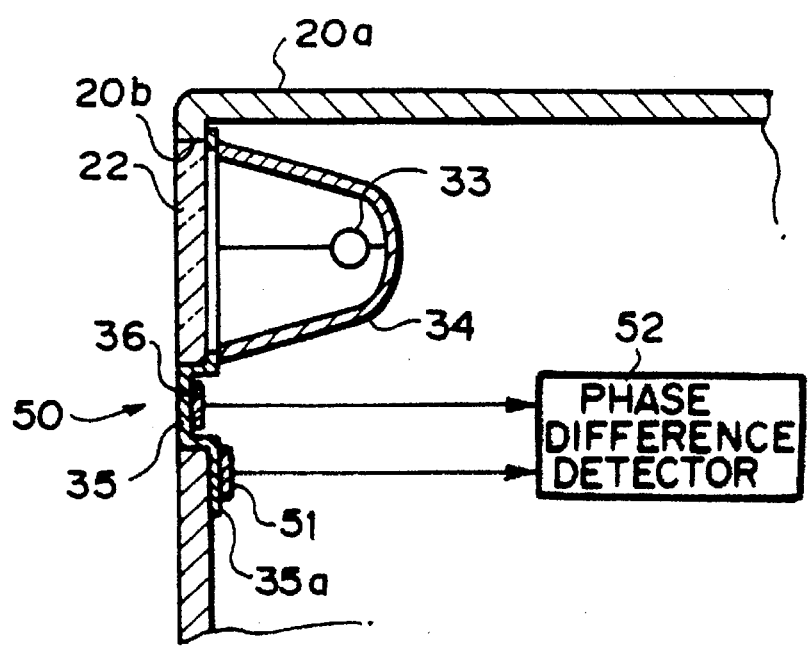
FIG. 4 is a cross-sectional view taken along line IV—IV in FIG. 3.

As shown in FIG. 4, the strobe light projecting system 21 comprises a xenon strobe lamp 33, a reflecting plate 34 which reflects forward strobe light emitted from the lamp 33, and the diffusion plate 22 which protects the lamp 33 as well as diffusing strobe light emitted from the lamp 33 according to the range view. The diffusion plate 22 is mounted on the cover 20a of the camera 20 along the upper edge and the left and right side edges of the window 20b of the strobe light projecting system 21 with the front face of the diffusion plate 22 exposed outward.

The touch sensor 50 comprises an insulating plate 35 of resin or the like and a detecting electrode 36 and a correction electrode 51 which are of conductive plate members. The front faces of the electrodes 36 and 51 are covered with the insulating plate 35. As will be described later, the correction electrode 51 is for preventing determining that a photographer's finger is resting on the diffusion plate 22 although the finger is touching the touch sensor 50 but is not on the diffusion plate 22. The insulating plate 35 is provided with upper and lower cranked edge portions and is mounted on the lower edge of the strobe light window 20b so that the upper cranked edge portion is engaged with the lower edge of the diffusion plate 22 and the lower cranked edge portion 35a rests on the inner surface of the cover 20a with the intermediate portion of the insulating plate 35 exposed outward between the lower edge of the diffusion plate 22 and the lower edge of the window 20a.

Figure 6:
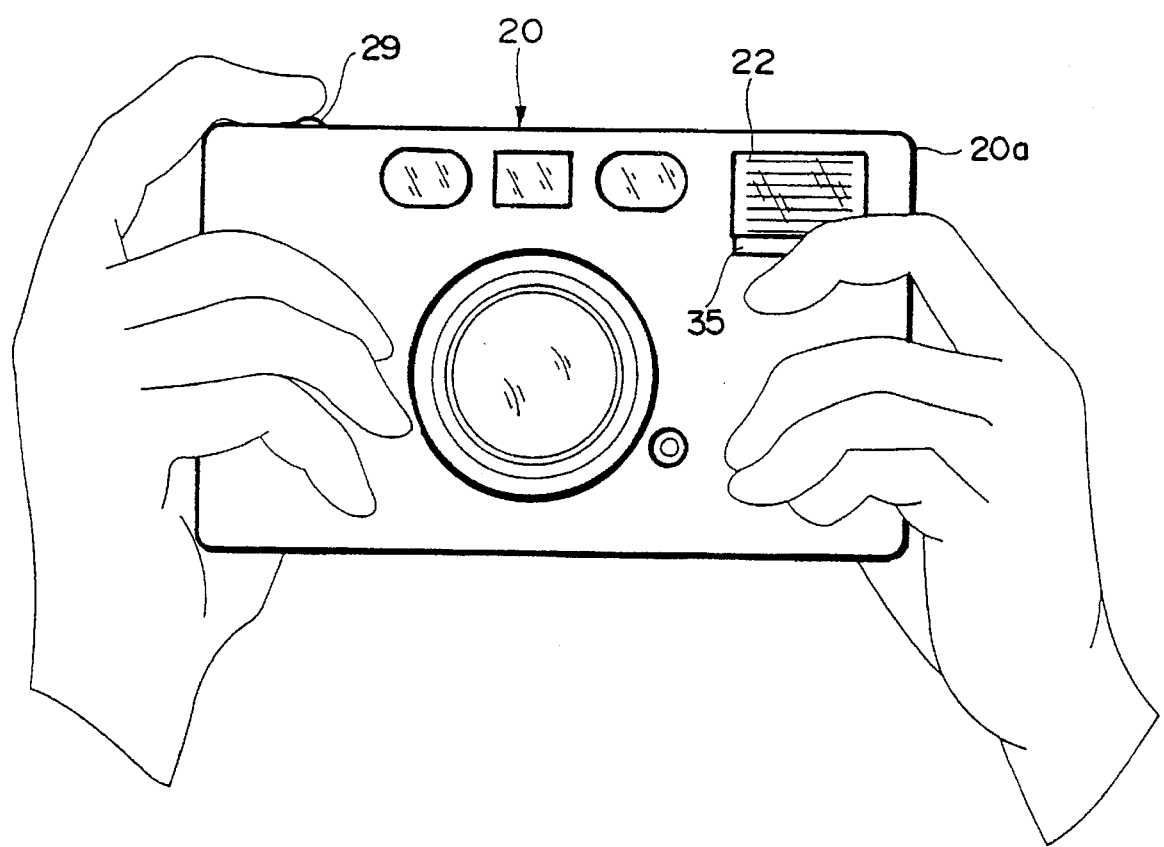
FIG. 6 is a front view showing a state where a photographer's finger is resting on the diffusion plate of the camera.

The detecting electrode 36 is mounted on the inner surface of the intermediate portion of the insulating plate 35 and is connected to a phase difference detecting circuit 52 disposed inside the camera 20. The detecting electrode 36 is for detecting a photographer's finger resting on the diffusion plate 22. When the photographer grips the camera body in a right way (i.e., without resting his finger on the diffusion plate 22), the electrostatic capacitance of the photographer is applied to the detecting electrode 36 through the cover 20a and the insulating plate 35, while when a photographer's finger is resting on the diffusion plate 22 (the insulating plate 35) as shown in FIG. 6, the electrostatic capacitance of the photographer is applied to the detecting electrode 36 through only the insulating plate 35. Similarly when the photographer grips the camera body in a right way (i.e., without resting his finger on the diffusion plate 22), the electrostatic capacitance of the photographer is applied to the correction electrode 51 through the cover 20a and the insulating plate 35, while when a photographer's finger is resting on the diffusion plate 22 (the insulating plate 35), the electrostatic capacitance of the photographer is applied to the correction electrode 51 through only the insulating plate 35. The electrostatic capacitance transmitted to each of the electrodes 36 and 51 is inversely proportional to the distance between the electrode and the photographer's finger. The size and position of the correction electrode 51 are so selected that the electrostatic capacitance transmitted to the correction electrode 51 through the cover 20a and the insulating plate 35 is equal to or slightly larger than that transmitted to the detecting electrode 36 when the photographer grips the camera body in a right way while the electrostatic capacitance transmitted to the correction electrode 51 through the insulating plate 35 is sufficiently smaller than that transmitted to the detecting electrode 36 when a photographer's finger is resting on the diffusion plate 22. By covering the detecting electrode 36 with the insulating plate 35, the touch sensor circuit can be prevented from being broken by the static electricity from the photographer.

The touch sensor circuit comprises an oscillator 178 (FIG. 2) which generates a high-frequency pulse signal, said phase difference detecting circuit 52, a microprocessing unit 124, and a switching circuit 180 which turns on and off the oscillator 178 and the phase difference detecting circuit 52 under the control of the microprocessing unit 124. Further the camera 20 is provided with an alarm LED 142 which is lit to inform of a photographer's finger resting on the diffusion plate 22 when the phase difference detecting circuit 52 detects a phase difference.

Figure 2:
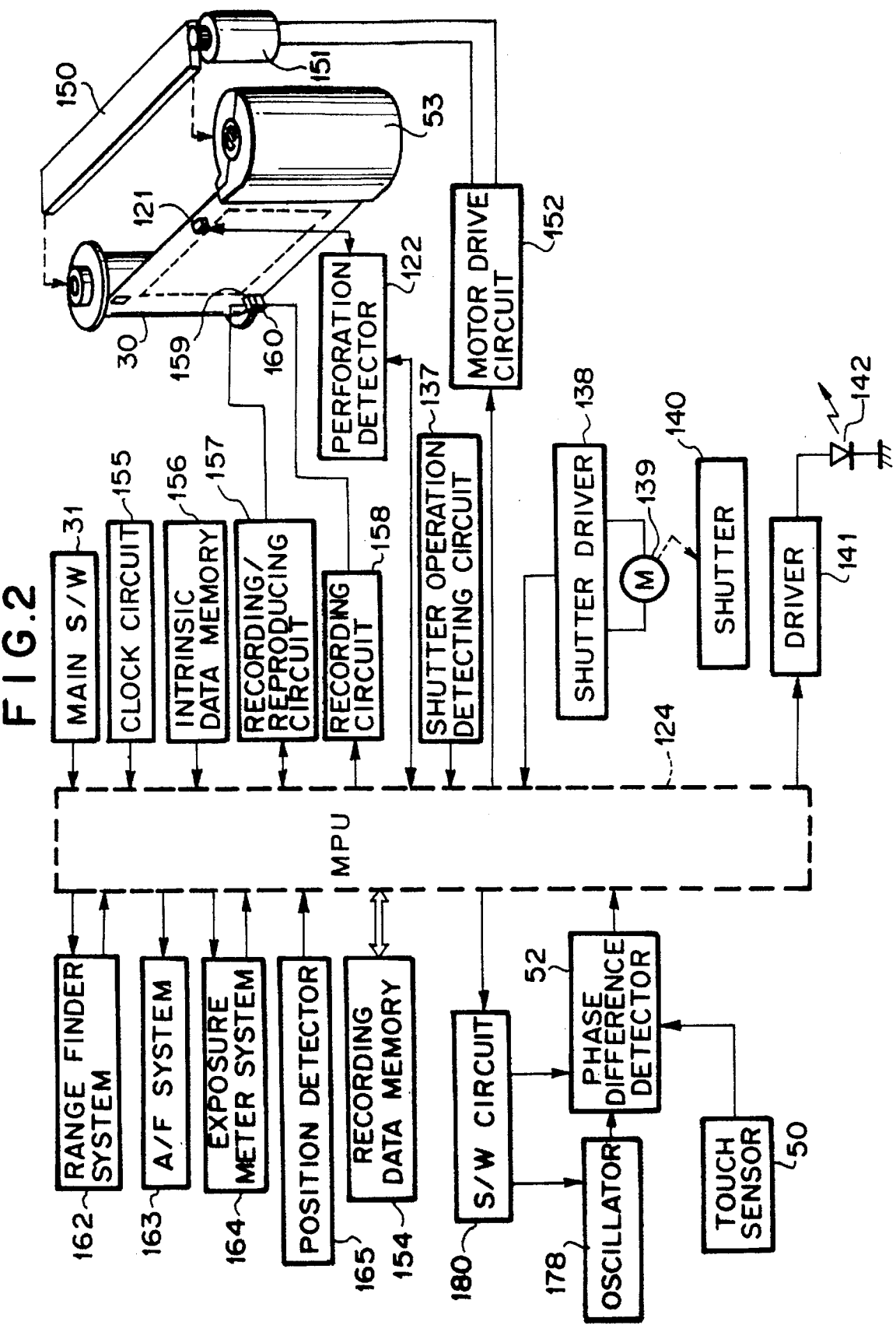
FIG. 2 is a block diagram showing the electric circuit of the camera.

As shown in FIG. 2, said main switch 31 and a shutter operation detecting circuit 137 are connected to the microprocessing unit 124. Though not shown in FIG. 2, the shutter operation detecting circuit 137 is connected to the shutter release button 29 and inputs into the microprocessing unit 124 a focusing command signal when the shutter release button 29 is pressed down halfway and a shutter release command signal when the shutter release button 29 is fully pressed down.

The microprocessing unit 124 causes the switching circuit 180 to turn on the oscillator 178 and the phase difference detecting circuit 52 upon receipt of the focusing command signal. When the oscillator 178 is on, it generates a high-frequency pulse signal with a predetermined signal and inputs it into the phase difference detecting circuit 52.

Operation of the touch sensor circuit will be described, hereinbelow.

Figure 5:
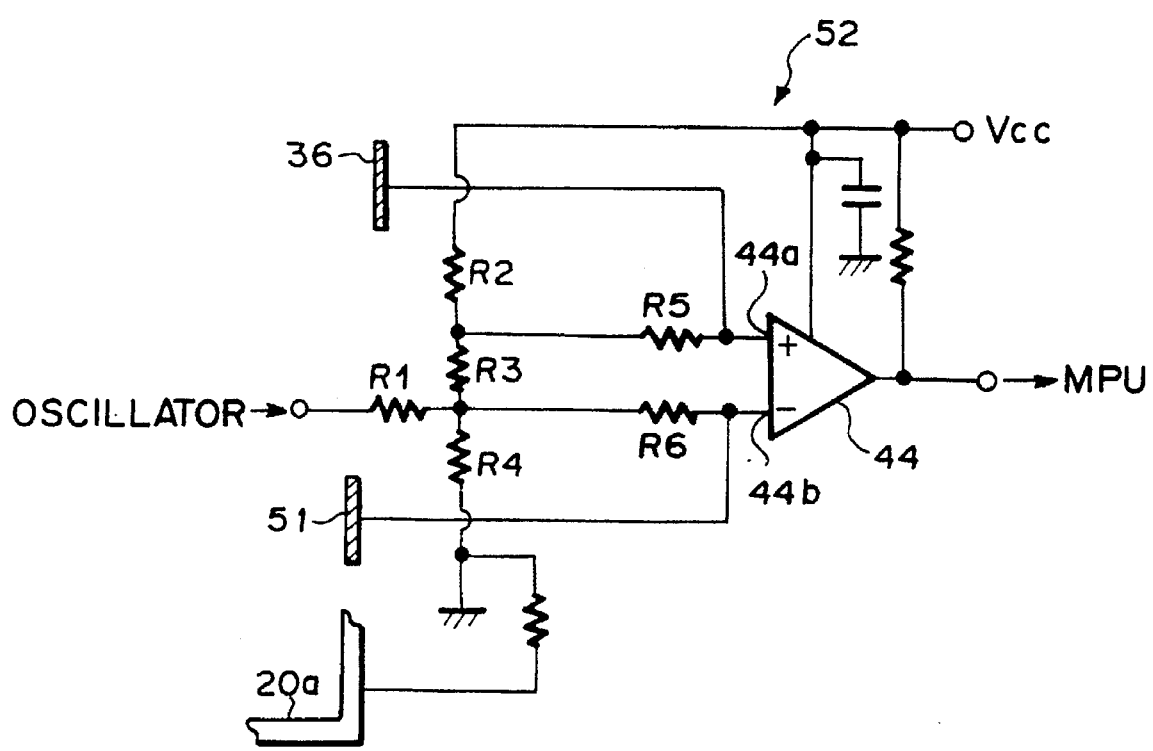
FIG. 5 is a circuit diagram of the phase difference detecting circuit shown in FIG. 4.
Figure 7A:
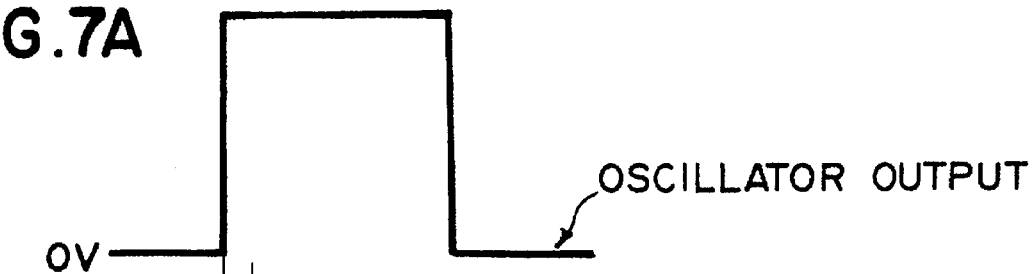
FIGS. 7A to 7D are views showing waveforms of high-frequency pulses in the respective conditions.

When the oscillator 178 and the phase difference detecting circuit 52 are turned on, the oscillator outputs a high-frequency pulse signal having sharp edges as shown in FIG. 7A and a detecting side high-frequency pulse signal is input into a non-inversion input terminal 44a of a comparator 44 (FIG. 5) through a resistor R5 while a reference side high-frequency pulse signal is input into an inversion input terminal 44b of the comparator 44 through a resistor 44b.

Figure 7B:
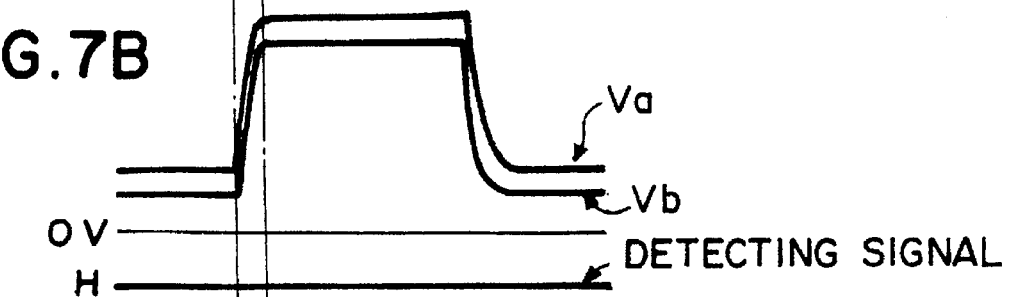

In a state where the oscillator 178 and the phase difference detecting circuit 52 are kept on and the cover 20a is in touch with nothing, the leading edges of the waveforms of the pulse signals respectively input into the input terminals 44a and 44b (changes in voltages Va and Vb) are dull as shown in FIG. 7B, whereby the phases of the pulse signals up to the peak voltages lag behind the output of the oscillator 178. As for the detecting side high-frequency pulse signal, this is because a delay circuit is formed by the electrostatic capacitance of the detecting electrode 36 itself and the resistor R5 and the leading edge of the pulse becomes dull. As for the reference side high-frequency pulse signal, this is because a delay circuit is formed by the electrostatic capacitance of the correction electrode 51 itself and the resistor R6 and the leading edge of the pulse becomes dull. At this time, since the voltage Va of the detecting side high-frequency pulse signal is held higher than the voltage Vb of the reference side high-frequency pulse signal, no phase difference is detected and the alarm LED 142 is not energized.

Figure 7C:
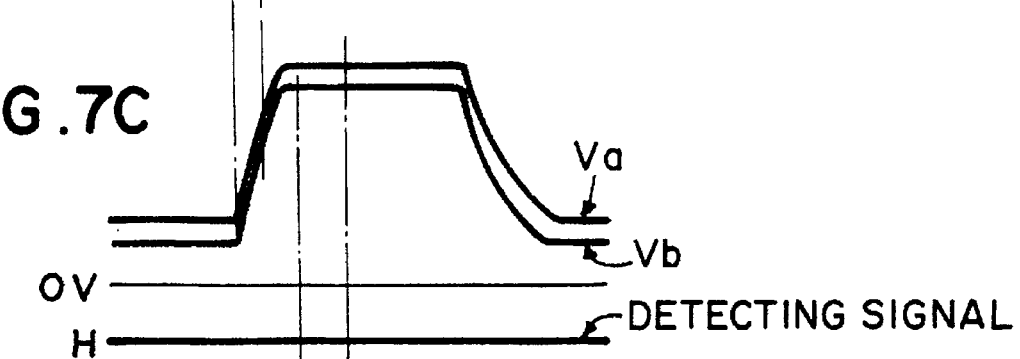
Figure 8A:
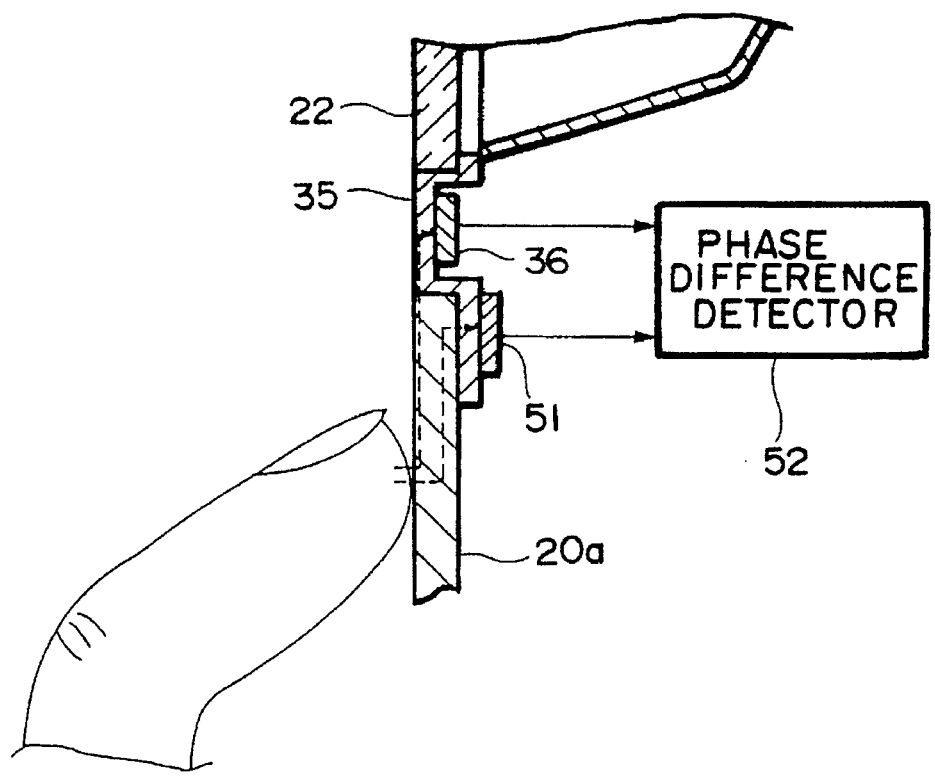
FIGS. 8A and 8B are views for illustrating application of the electrostatic capacitance of the photographer to the touch sensor in different states.

In a state where the photographer grips the camera body in a right way without resting his finger on the diffusion plate 22 as shown in FIG. 8A, the electrostatic capacitance of the photographer is applied to the detecting electrode 36 and the correction electrode 51 through the cover 20a and the insulating plate 35. In this state, the leading edges of the waveforms of the pulse signals are duller than those shown in FIG. 7B, whereby the phases of the pulse signals up to the peak voltages lag more behind the output of the oscillator 178 as shown in FIG. 7C. Since the size and position of the correction electrode 51 are so selected that the electrostatic capacitance transmitted to the correction electrode 51 through the cover 20a and the insulating plate 35 is equal to or slightly larger than that transmitted to the detecting electrode 36 when the photographer grips the camera body in a right way, the phase of the reference side pulse signal up to the peak voltage is equal to or slightly lags behind that of the detecting side pulse signal as shown in FIG. 7C. Accordingly the voltage Va of the detecting side high-frequency pulse signal is held higher than the voltage Vb of the reference side high-frequency pulse signal and the alarm LED 142 is not energized.

Figure 8B:
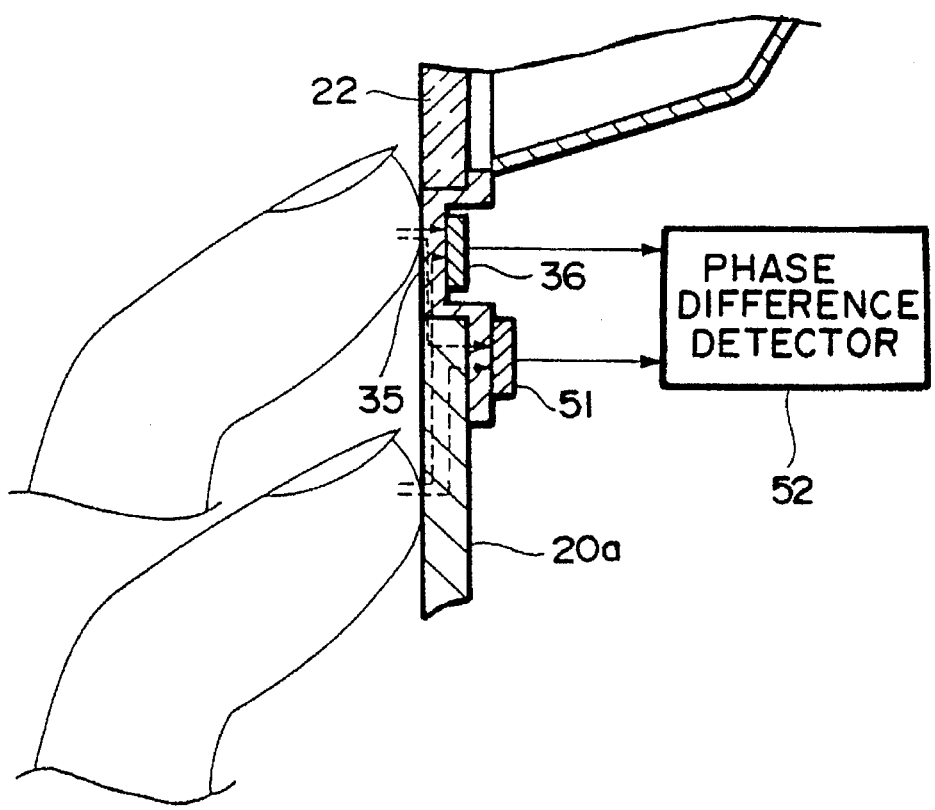

When the photographer's finger is resting on the diffusion plate 22 as shown in FIG. 8B, the electrostatic capacitance of the photographer is transmitted to the detecting electrode 36 through two paths, one through the insulating plate 35 and the other through the cover 20a and the insulating plate 35. Similarly the electrostatic capacitance of the photographer is transmitted to the correction electrode 51 through two paths, one through the insulating plate 35 and the other through the cover 20a and the insulating plate 35.

The electrostatic capacitance of the photographer transmitted to each electrode through the insulating plate 35 only is sufficiently larger than that transmitted through both the cover 20a and the insulating plate 35 and accordingly more affects dulling of the leading edges of the detecting side high-frequency pulse and the reference side high-frequency pulse. Accordingly in this case, the phase difference between the high-frequency pulses due to the electrostatic capacitance transmitted to each electrode through the cover 20a only may be neglected.

Figure 7D:
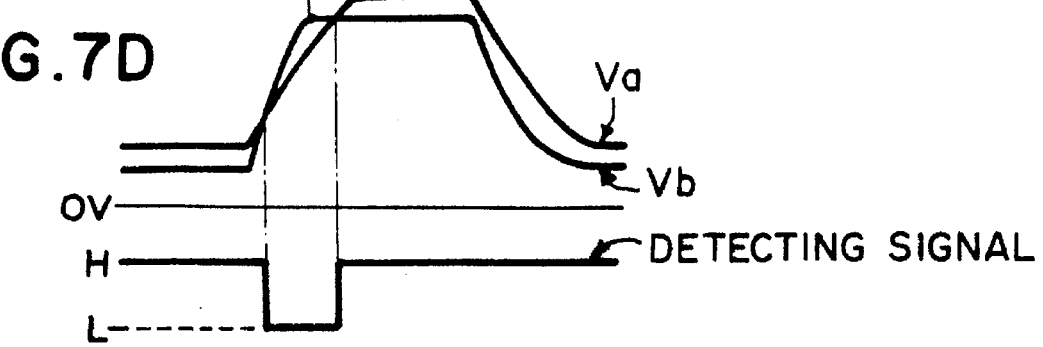

Since the correction electrode 51 is positioned where the shortest path from the photographer's finger to the detecting electrode 36 through the insulating plate 35 only is shorter than that from the photographer's finger to the correction electrode 51 whatever portion of the insulating plate 35 the photographer's finger touches, the electrostatic capacitance transmitted to the detecting electrode 36 is larger than that transmitted to the correction electrode 51. Accordingly when a photographer's finger is resting on the diffusion plate 22, the leading edges of the pulse signals become duller than those shown in FIG. 7C and at the same time the leading edge of the detecting side pulse signal becomes duller than that of the reference side pulse signal as shown in FIG. 7D. Thus the phase of the detecting side pulse signal up to the peak voltage comes to lag behind that of the reference pulse signal and the voltage Va of the detecting side high-frequency pulse signal becomes lower than the voltage Vb of the reference side high-frequency pulse signal, whereby the level of the detecting signal from the comparator 44 turns to H from L and the alarm LED 142 is energized.

The electrical structure of the camera of this embodiment will be described with reference to FIG. 2, hereinbelow. In FIG. 2, said shutter operation detecting circuit 137 inputs into the microprocessing unit 124 a focusing command signal when the shutter release button 29 is pressed down halfway and a shutter release command signal when the shutter release button 29 is fully pressed down as described above. When the focusing command signal is input into the microprocessing unit 124, the microprocessing unit 124 actuates a range finder system 162, and autofocusing system 163 and an exposure meter system 164 to measure the object distance, focus the taking lens system 28, measure the brightness of the object and calculate an optimal exposure. When the shutter release command signal is input into the microprocessing unit 124, the microprocessing unit 124 actuates a shutter drive circuit 138 to drive a stepping motor 139 by an angle corresponding to the optimal exposure calculated. Thereafter the stepping motor 139 is reversed to close the shutter blade 140. In this manner, one exposure frame of a film is exposed.

A camera position detecting system 165 detects the position of the camera 20 during exposure, that is, whether the camera 20 is held in the normal position, in the sideways position or in an intermediate position between the normal position and the sideways position, and inputs information on the position of the camera 20 into the microprocessing unit 124. When the camera 20 is held an intermediate position, the camera position detecting system 165 detects the inclination of the camera 20 and inputs also information on the inclination of the camera 20 into the microprocessing unit 124.

A clock circuit 155 outputs present date and time moment by moment to the microprocessing unit 124.

An intrinsic data memory 156 stores data intrinsic to the camera, e.g., the kind of the camera (name of the maker, name of model, serial number and the like), F number of the taking lens, focal length of the lens and the like, and outputs the data as required.

A recording data memory stores data to be recorded on a magnetic recording track 30g of a film 30 (to be described later) out of a plurality of pieces of data detected or calculated by various systems and mechanisms connected to the microprocessing unit 124.

FIG. 9 shows an example of a photographic film 30 to be loaded in the camera 20 of this embodiment. A film feed mechanism (not shown) is incorporated in a magazine body 53 and a film 30 is wound into the magazine body 53 to the end thereof when the film 30 is not used. When the magazine body 53 is loaded in the camera 20, a film feed mechanism comprising a motor drive circuit 152, a film feed motor 151 and a film feed mechanism 150 rotates a film spool in a film feed out direction (the regular direction) and feeds out the film 30 through a film exit slit of the magazine body 53. The magazine body 53 is used also as a container in which a developed film in a continuous length is stored, and the developed film is returned to the user as it is stored in the magazine body 53. When the film spool is rotated in the regular direction, the film is fed out and when the film spool is rotated in the reverse direction, the film is taken up in the magazine body.

A pair of magnetic recording layers 30a and 30b are formed on the rear side of the film 30 respectively along the upper and lower edges of the film 30. A pair of film maker recording tracks 30c and 30d are formed respectively in the upper and lower magnetic recording layers 30a and 30b in the film leader. In the upper film maker recording track 30c has been recorded information which is intrinsic to the film and unnecessary for taking pictures such as information on manufacture and process of the film, e.g., the maker's serial number, the lot number of photographic emulsion used, code representing developing formulation and the like. In the lower film maker recording track 30d has been recorded information on the performance of the film such as the type of the film, monochrome or color, the number of exposure frames, ISO sensitivity and the like.

The information recorded in the film maker recording tracks 30c and 30d is read in various stages of use of the film 30. For example, when the magazine body 53 is loaded in the camera 20, the film feed mechanism feeds the film leader to a predetermined position and the information in the track 30d is read by a recording/reading system comprising a recording/reproducing circuit 157, a recording circuit 158 and magnetic heads 159 and 160 to be used for taking pictures. The information recorded in the track 30c is used by the film maker upon occurrence of trouble and the information on the developing formulation is used in the laboratory.

A pair of laboratory recording tracks 30e and 30f are formed respectively below the film maker recording tracks 30c and 30d in the film leader. In the recording track 30e, information on development and/or printing is recorded in the laboratory according to order of the user. ID codes of the camera and/or user and the like are recorded in the recording track 30f by a magnetic recording system built in the camera during initial feed of the film leader.

The film 30 is provided with a plurality of perforations 30P one for each frame. The perforations 30P are detected by a photosensor 121 during feed of the film 30 to detect that the length by which the film 30 is fed. The perforation on the front end of the film leader is used for detecting the front end of the film leader when automatically feeding the film leader and for detecting end of film rewinding.

After exposure of one frame, the motor 151 is driven by a motor drive signal from the motor drive circuit 152 which is controlled by the microprocessing unit 124 and the film 30 is fed by one frame length by way of the film feed mechanism 150. During feeding by one frame length, exposure data and the like stored in the recording data memory are read out and recorded in a recording track 30g below the exposed frame 3F. The exposure data include, for instance, date and time, brightness of the object, object distance, position of the camera, aspect ratio, to be or not to be printed, use of strobe light, lens opening, shutter release speed and exposure correction which are obtained from various systems connected to the microprocessing unit 124. These data may be recorded in various recording formats. Examples of such recording formats are described, for instance in, our Japanese Patent Application No. 5(1993)-322393.

The operation of the camera 20 of this embodiment will be described with reference to FIGS. 2 and 10, hereinbelow. When the shutter release button 29 is pressed down halfway, shutter release operation is initiated. (step S1) At this time, a focusing command signal is input into the microprocessing unit 124 and the microprocessing unit 124 outputs command signals to the exposure meter system 164 and the range finder system 162, thereby measuring the brightness of the object and the object distance. (steps S2 and S3) Then microprocessing unit 124 determines the exposure time and the like on the basis of the result of measurement of the brightness of the object and the amount of movement of the focusing lens and the like on the basis of the result of measurement of the object distance.

Then the microprocessing unit 124 causes the autofocusing system 163 to set the focusing lens and/or a correction lens in predetermined positions according to the determination.

Then it is determined whether the strobe operation mode has been set to off-mode or on-mode. (steps S5 and S7) In a camera of this type, the strobe operation mode can be set in three modes, one off-mode in which the strobe light is not operated irrespective of exposure condition, another on-mode in which the strobe light is operated and the other auto-mode in which whether or not the strobe light is to be operated is automatically determined and the strobe light is operated if necessary.

When it is determined in step S5 that the strobe operation mode has been set to off-mode, a strobe flag Fs is set to OFF. (step S6) When it is determined in step S7 that the strobe operation mode has been set to on-mode, the strobe flag Fs is set to ON. (step S8)

When it is determined that the strobe operation mode has been set to neither on-mode nor off-mode, it is determined whether the Ev value (the output voltage signal corresponding to the amount of light) is higher than a limit value L below which the shutter speed must be long to such an extent that the picture will be blurred due to unintentional movement of the camera body. (step S9) When it is determined that the former is lower than the latter, external light is poor and the strobe light must be operated. Accordingly, the strobe flag Fs is set to ON. (step S10) Otherwise the strobe light need not be operated and accordingly, the strobe flag Fs is set to OFF. (step S11)

Steps S9 to S11 correspond to auto-mode operation of the strobe light.

After the strobe flag Fs is set to ON or OFF in the manner described above, whether or not the photographer's finger is resting on the diffusion plate 22 is determined on the basis of the level of the detecting signal input into the microprocessing unit 124 from the phase difference detecting circuit 52. (step S12) When it is determined that the photographer's finger is resting on the diffusion plate 22, a finger resting flag Ff is set to ON.

When the shutter release button 29 is subsequently fully pressed down, the shutter is released and the frame is exposed for the exposure time determined in step S2. (step S13) Detection of whether or not the photographer's finger is resting on the diffusion plate 22 may be performed in the exposure process in step S13.

Then in step S14, it is determined whether the strobe flag Fs is ON and when it is determined that the strobe flag Fs is ON, then it is determined in step S15 whether the finger resting flag Ff is ON.

When it is determined in step S15 that the finger resting flag Ff is ON, that is, when both the strobe flag Fs and the finger resting flag Ff are ON, the microprocessing unit 124 proceeds to step S17 after resetting the strobe flag Fs to OFF in step S16.

When it is determined in step S14 that the strobe flag Fs is OFF or when it is determined in step S15 that the finger resting flag Ff is OFF, the microprocessing unit 124 directly proceeds to step S17.

In step S17, data on the state of the strobe flags Fs and the finger resting flag Ff are recorded in the recording track 30g as well as the exposure data and the like while the film 30 is fed by one frame length.

Thus in the camera of this embodiment, when a frame was exposed under strobe light with the diffusion plate 22 blocked with a photographer's finger, the data on the operation of the strobe light for the frame is recorded as representing that the frame was exposed without operating the strobe light.

Accordingly in the laboratory, the frame exposed under strobe light with the diffusion plate 22 blocked with a photographer's finger is printed in the algorithm for the frames exposed without strobe light, whereby the frame can be printed in such density that the object can be recognized though the image quality somewhat deteriorates.

The camera of this embodiment may be variously modified. For example, as the means for detecting a photographer's finger resting on the diffusion plate 22, various known touch sensors other than the electrostatic capacitance type touch sensor as well as non-touch type sensors using a light reflecting sensor or the like.

Though, in the embodiment described above, the camera has a format in which the strobe flag is set when the strobe light was operated, the present invention may be applied to cameras having different formats. For example, it is possible to directly set a flag which represents that the operation of the strobe tube was unsatisfactory. Further instruction on the number of prints required may be set to "0" when it is determined that a photographer's finger was resting on the strobe window during exposure Further, though, in the embodiment described above, whether a photographer's finger was resting on the strobe window during exposure is detected, whether a photographer's finger was resting on the light projecting window 23, the light receiving window 24, the exposure meter window 25, or the taking lens system 28 may be detected. In this case it is preferred that the instruction on the number of prints required be set to 0 instead of rewriting the data on the exposure condition and the like, whereby printing of defective picture can be prevented.

In the case of a camera provided with a means for recognizing and designating the position of a main object, a blocked region which strobe light cannot reach due to the finger on the strobe window may be calculated on the basis of the position of the finger on the strobe window, and the data representing that the strobe light was not operated may be recorded only when the blocked region covers the main object. In the case of a camera provided with a means for specifying the print format, a blocked region which strobe light cannot reach due to the finger on the strobe window may be calculated on the basis of the position of the finger on the strobe window, and the data representing that the strobe light was not operated may be recorded only when the blocked region is not included in a region to be trimmed according to the specified print format.

As the means for recognizing and designating the position of a main object, an line-of-vision detecting system disclosed, for instance, in Japanese Unexamined Patent Publication No. 6(1994)-34873 may be employed. The line-of-vision detecting system is incorporated in some of autofocusing single-lens reflex cameras which become available recently and reckons an object on the line of vision to be the main object.

A second embodiment of the present invention will be described with reference to FIGS. 11 to 17, hereinbelow.

Figure 11:
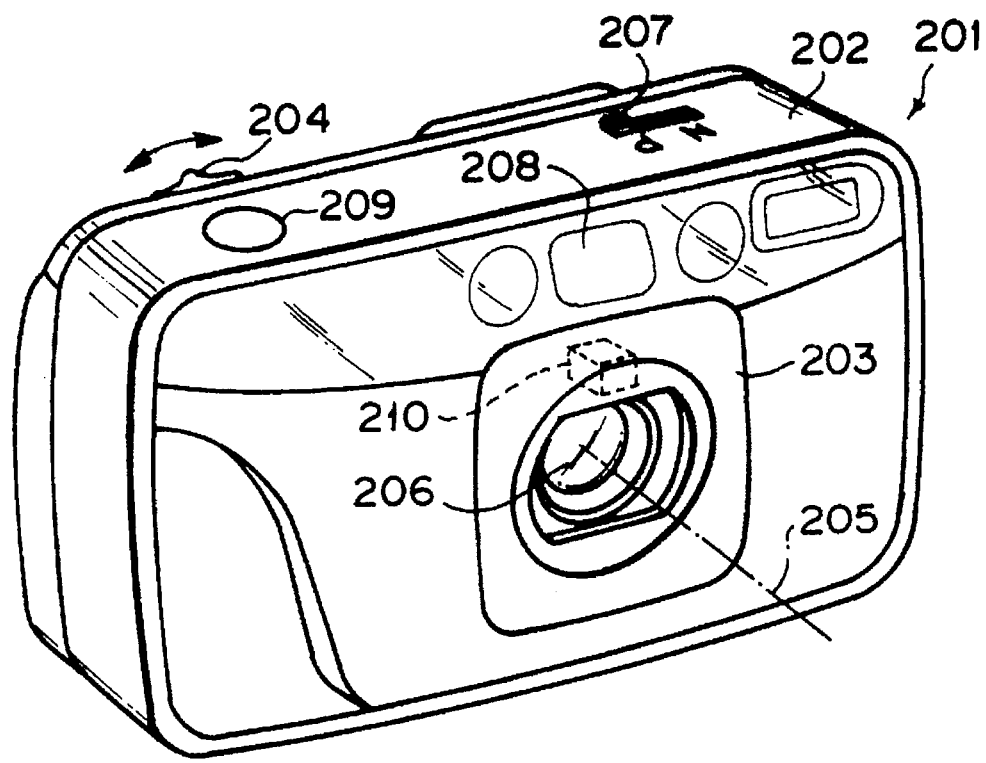
FIG. 11 is a perspective view showing a photographic camera in accordance with a second embodiment of the present invention.
Figure 12:
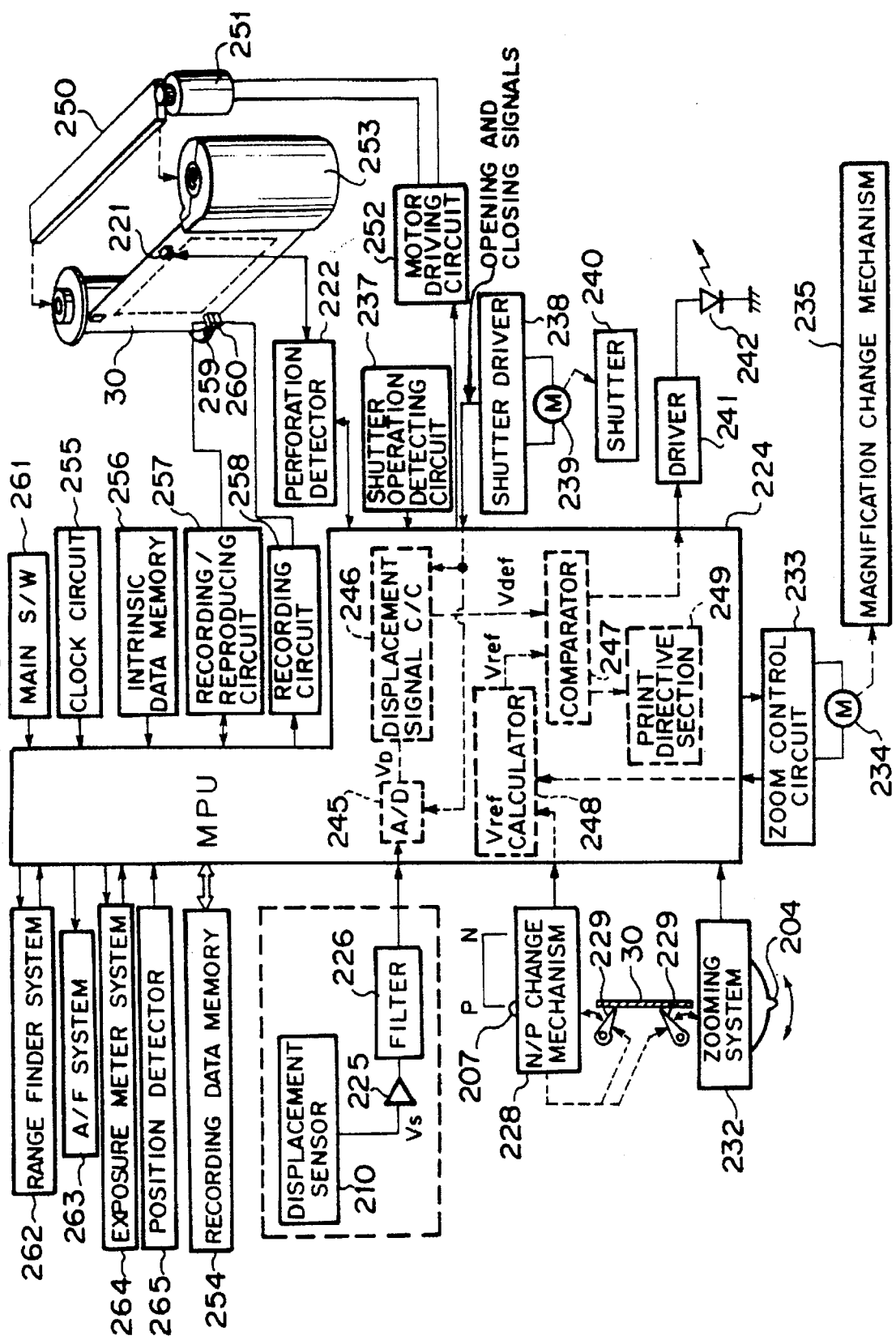
FIG. 12 is a block diagram showing the electric circuit of the camera.

In FIGS. 11 and 12, the camera 201 of this embodiment comprises a taking zoom lens 206 which is supported on a camera body 202 by a zoom barrel 203. The zoom barrel 203 is moved back and forth in the direction of the optical axis 205 of the zoom lens 206 to change the focal length of the lens 206 in response to operation of a zoom lever 204 in the direction the arrow. A frame size change knob 207 is provided on the top of the camera body 202. When the frame size change knob 207 is brought to "N", the frame size is set to a full size (24 mm×36 mm) and when it is brought to "P", the frame size is set to a panoramic size (13 mm×36 mm) and at the same time the aspect ratio of the field of view in the viewfinder is changed to that of the panoramic size. In the laboratory, the frame exposed in the panoramic size is printed in an aspect ratio double that for the full size. Reference numeral 209 denotes a shutter release button.

A displacement sensor 210 for detecting that the camera body 202 was moved to blur the picture during exposure of each frame is provided in the zoom barrel 203.

In FIG. 12, reference numeral 224 denotes a microprocessing unit which is turned on and off by operation of a main switch 261.

Though systems for detecting that the camera body 202 was moved to blur the picture during exposure of a frame are described in our Japanese Patent Application No. 6(1995)-162396, an example such a system will be described in detail, hereinbelow.

Figure 13:
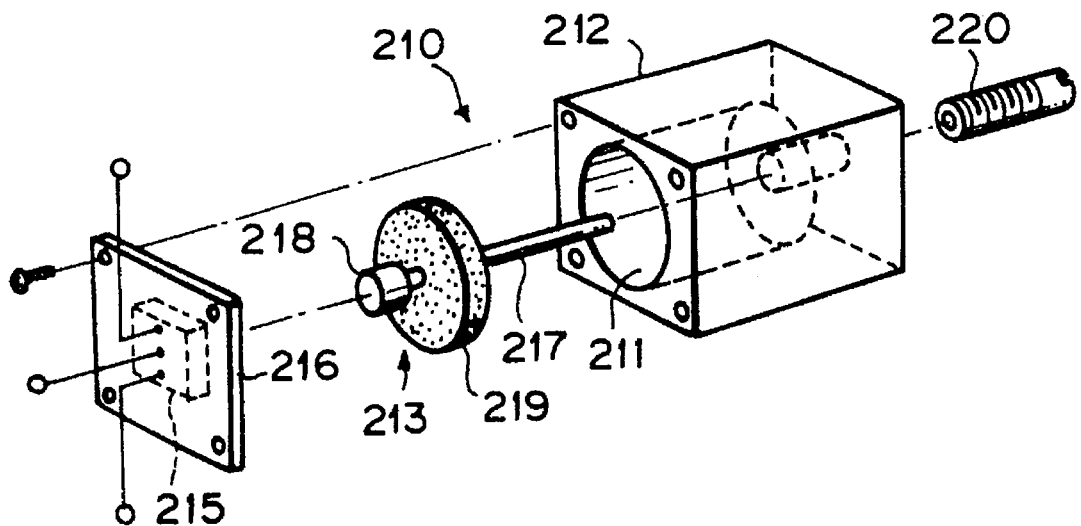
FIG. 13 is an exploded perspective view of the displacement sensor.

A signal voltage Vs from the displacement sensor 210 is input into the microprocessing unit 224 through an amplifier 225 and a filter circuit 226. The filter circuit 226 is a high-cut filter for high-frequency noise elimination. As shown in FIG. 13, the displacement sensor 210 comprises a casing 212 having a cylindrical inner space 211, a vibrator 213 disposed in the space 211, and a magnetoresistive element 215 fixed on a base plate 216. The vibrator 213 comprises a rod 217 having a suitable resiliency such as of piano wire, a magnet 218 fixed to an end of the rod 217 and a damper 219 for absorbing vibration. The other end of the rod 217 is fixed to an adjustment screw 220 which is screwed in the casing 212. The space between the magnetoresistive element 215 and the magnet 218 can be adjusted by rotating the adjustment screw 220. The rod 217 is deformed when the camera body 202 makes a motion to change the direction of the optical axis 205, that is, a force is applied to the camera body 202 and the acceleration of motion changes. Since the displacement of the camera body 202 due to unintentional movement of the hands during exposure is most prominent in a direction in which the optical axis 205 is inclined along a vertical plane, detection of movement of the camera body which can blur the picture (will be referred to as "blurring movement of the camera" hereinbelow) will be described only for the case of detection of the blurring movement of the camera due to the displacement of the camera body in the direction, hereinbelow. However, displacement of the camera body in other directions can be detected in the same manner, and accordingly blurring movement of the camera due to displacements of the camera body in a plurality of directions can be detected by using a plurality of displacement sensors 210.

Figure 14:
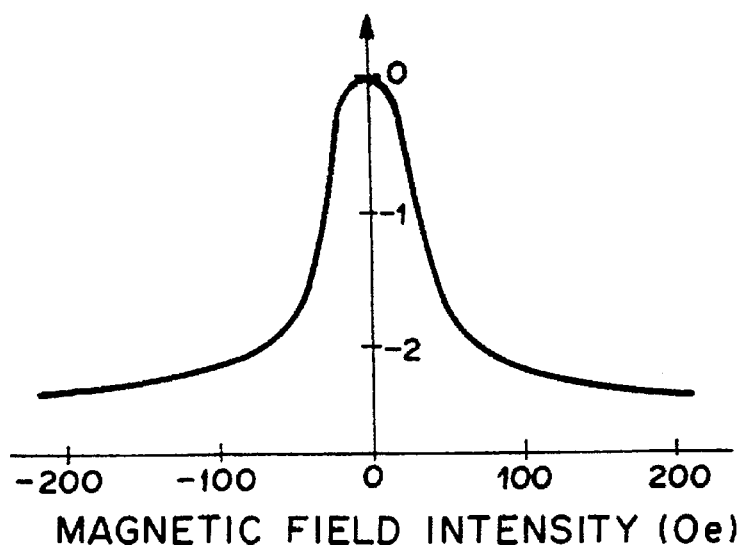
FIG. 14 is a graph showing the change in electric resistance of the magnetoresistive element with change in the magnetic field intensity.

When the rod 217 is bent by vibration, the position of the magnet 218 relative to the magnetoresistive element 215 changes and the magnetic field intensity to the magnetoresistive element 215 changes. The magnetoresistive element 215 is an element having a magnetoresistive effect, that is, an element whose electric resistance changes with the magnetic field intensity as shown in FIG. 14, wherein the vertical axis represents the rate of change of the electric resistance and the transverse axis represents the magnetic field intensity applied to the element. As can be seen from FIG. 14, The electric resistance of the magnetoresistive element 215 lowers as the magnetic field intensity increases and the rate of change of the electric resistance is saturated when the magnetic field intensity increases to a certain extent. Further from the fact that the characteristic curve is symmetrical about the vertical axis as shown in FIG. 14, it can be understood that the electric resistance of the magnetoresistive element 215 changes with the magnetic field intensity in the same manner irrespective of the pole (N or S) of the magnet.

Figure 15:
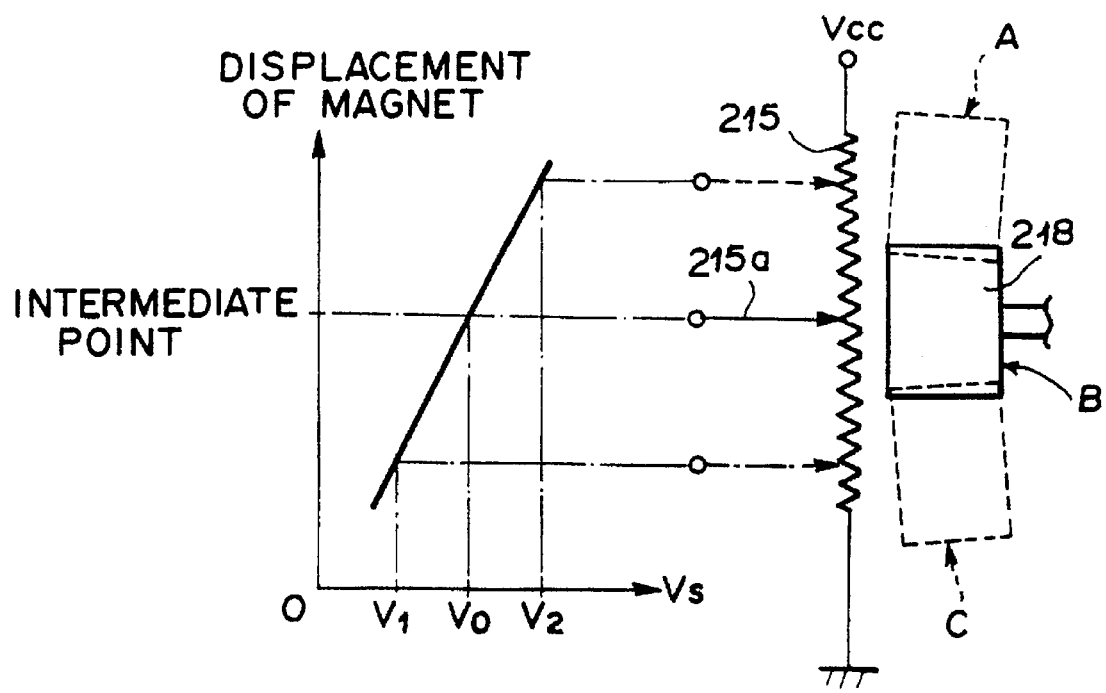
FIG. 15 is a view schematically showing displacement of a magnet relative to a magnetoresistive element on the basis of an equivalent circuit.

The displacement of the magnet 218 is converted to an electric signal in the following manner. FIG. 15 shows an equivalent circuit for illustrating the movement of the magnet 218 relative to the magnetoresistive element 215 and the relationship between the signal voltage output from a detecting terminal 215a connected to the middle point of the magnetoresistive element 215 and the displacement of the magnet 218. Position B shown by the solid line is a neutral position where the displacement of the magnet 218 relative to the magnetoresistive element 215 is 0. The position of the magnet 218 to the magnetoresistive element 215 is adjusted so that the signal voltage V0 when the magnet 218 is in the neutral position B is the intermediate value between the signal voltage V1 when the magnet 218 is in position C where the magnet 218 is most displaced downward and the signal voltage V2 when the magnet 218 is in position A where the magnet 218 is most displaced upward, the signal voltage linearly changing between the position C and the position A. With this arrangement, the signal voltage Vs from the detecting terminal 215a is proportional to the displacement of the magnet 218.

As a magnetoresistive element whose electric resistance lowers as the magnetic field intensity increases (negative magnetoresistive characteristics), there have been known metal film resistors such as of an alloy of nickel and cobalt and an alloy of nickel and iron. Also magnetoresistive elements whose electric resistance increases as the magnetic field intensity increases (positive magnetoresistive characteristics), e.g., a semiconductor of indium-antimony alloy, can be used. By applying a ferromagnetic member such as of iron to the back side of the magnetoresistive element 215, for instance, on the side facing the base plate 216 and using it as a yoke, the detecting sensitivity of the displacement sensor 210 can be improved.

The damper 219 is for instantly attenuating vibration generated by deformation of the rod 217 due to acceleration acting on the camera body 202 and is formed of vibration absorbing material such as sponge which is substantially equal to the inner space 211 of the casing 212 in diameter. A coil spring may be used instead of the rod 17. The magnet 218 is fixed to one end of the coil spring and the other end of the coil spring is fixed to the adjustment screw 220. Further the vibration generated by deformation of the rod 217 may be attenuated by an oil damper formed by filling the inner space 211 of the casing 212 with oil.

A frame size change mechanism 228 moves a pair of mask plates 229 to the position shown in FIG. 12 and changes frame size to the panoramic size when the frame size change knob 207 is set to "P". When the frame size change knob 207 is set to "N", the frame size change mechanism 228 retracts the mask plates 229 away from the optical path of object light and changes the frame size to the full size. Further the frame size change mechanism 228 outputs a frame size signal representing the set frame size to the microprocessing unit 224 as information on the aspect ratio of the picture.

A zooming system 232 inputs a zoom operation signal corresponding to the operating direction of the zoom lever 204 into the microprocessing unit 224. According to the zoom operation signal, the microprocessing unit 224 inputs a zoom drive signal into a zoom control circuit 233. The zoom control circuit 233 drives a motor 234 in the regular direction or the reverse direction to move the zoom lens 206 by way of a magnification change mechanism 235 toward the wide side or the tele side according to the zoom drive signal. Further the zoom control circuit 233 feeds a zoom position signal representing the angular position of the motor 234 back to the microprocessing unit 224.

A shutter operation detecting circuit 237 inputs into the microprocessing unit 224 a focusing command signal when the shutter release button 209 is pressed down halfway and a shutter release command signal when the shutter release button 209 is fully pressed down. When the focusing command signal is input into the microprocessing unit 224, the microprocessing unit 224 actuates a range finder system 262, and autofocusing system 263 and an exposure meter system 264 to measure the object distance, focus the taking lens system 206, measure the brightness of the object and calculate an optimal exposure. When the shutter release command signal is input into the microprocessing unit 224, the microprocessing unit 224 actuates a shutter drive circuit 238 to drive a stepping motor 239 by an angle corresponding to the optimal exposure calculated. Thereafter the stepping motor 239 is reversed to close the shutter blade 240. In this manner, one exposure frame of a film is exposed.

The shutter drive circuit 238 functions also as a timing signal generating means for measurement of displacement of the camera body 202. That is, the shutter drive circuit 238 inputs into the microprocessing unit 224 a shutter opening signal the moment the shutter blade 240 is opened and a shutter closure signal the moment the shutter blade 240 is closed. These signals can be obtained on the basis of the times at which driving pulses for driving the stepping motor 239 in the regular and reverse directions are supplied or, for instance, by photoelectrically detecting the position of the shutter blade 240.

When a blurring movement of the camera is detected during exposure, the microprocessing unit 224 inputs an alarm signal into an LED driver 241 to put on an LED 142. The LED 142 is incorporated in a viewfinder 208 and accordingly the photographer can see the LED 142 light in the viewfinder 208 when a blurring movement of the camera is detected. Further the microprocessing unit 224 sets to "0" the content of print requirement data (data on whether the frame is to be printed) stored in a recording data memory 254. When a blurring movement of the camera is not detected during exposure, the LED 142 is not put on and the content of the print requirement data is set to "1". That the content of the print requirement data is "0" means that the frame is not to be printed and that the content of the print requirement data is "1" means that the frame is to be printed. The data are used as instruction on printing for the laboratory and in this particular embodiment the data are especially for simultaneous printing.

A camera position detecting system 265 detects the position of the camera body 202 during exposure, that is, whether the camera body 202 is held in the normal position, in the sideways position or in an intermediate position between the normal position and the sideways position, and inputs information on the position of the camera body 202 into the microprocessing unit 224. When the camera body 202 is held an intermediate position, the camera position detecting system 265 detects the inclination of the camera body 202 and inputs also information on the inclination of the camera body 202 into the microprocessing unit 224.

A clock circuit 255 outputs present date and time moment by moment to the microprocessing unit 224.

An intrinsic data memory 256 stores data intrinsic to the camera, e.g., the kind of the camera (name of the maker, name of model, serial number and the like), F number of the taking lens, focal length of the lens and the like, and outputs the data as required.

A recording data memory 254 stores data to be recorded on a magnetic recording track 30g of a film 30 shown in FIG. 9 (A film of the same type as that used in the first embodiment is loaded in the camera of this embodiment) out of a plurality of pieces of data detected or calculated by various systems and mechanisms connected to the microprocessing unit 224. Such data are written in the recording data memory 254 (comprising a RAM) upon release of the shutter.

The operation of the camera of this embodiment will be described with reference to FIGS. 12 and 16, hereinbelow.

When the shutter button 209 is depressed, the shutter is opened and at the same time a shutter opening signal is input into an A/D convertor 245 in the microprocessing unit 224. (step #1) Thereafter the shutter is closed and at the same time a shutter closing signal is input into the A/D convertor 245. (step #3) The A/D convertor 245 reads signal voltages Vs from the filter circuit 226 at regular sampling intervals from the receipt of the shutter opening signal to the receipt of the shutter closing signal and converts the signal voltages Vs to digital signal voltages Vd. (steps #2 to #4) The digital signal voltages Vd are successively in a displacement signal calculating circuit 246. The displacement signal calculating circuit 246 calculates the difference between the highest and the lowest of digital signal voltages Vd input and inputs the difference into a comparator 247 as an absolute displacement signal Vdef. (step #5) The absolute displacement signal Vdef represents the amplitude of vibration of the magnet 218.

A reference value calculator 248 calculates a reference value Vref on the basis of a frame size signal from a frame size change mechanism 228 and a zoom position signal from the zoom control circuit 233. (step #6) The reference value Vref is set smaller when the frame size is the panoramic size than when the frame size is the full size and is set smaller when the zoom lens is in the tele side than when the zoom lens is in the wide side.

The comparator 247 compares the absolute displacement signal Vdef with the reference value Vref (step #7) and when the former is not smaller than the latter, the comparator 247 outputs an alarm signal and a print inhibition signal. The alarm signal is input into the LED driver 241 and the LED 242 is put on. (step #10) The print inhibition signal is input into a print directive section 249. The print directive section 249 sets the data on whether the frame is to be printed to "0" upon receipt of the print inhibition signal. (step #11) When the frame is not to be printed, the data on whether the frame is to be printed may be kept unwritten instead of setting it to "0"

On the other hand when it is determined in step #7 that the absolute displacement signal Vdef is smaller than the reference value Vref, no alarm signal is output and a print prompting signal is input into the print directive section 249. The print directive section 249 sets the data on whether the frame is to be printed to "1" upon receipt of the print prompting signal. (steps #8 and #9)

As can be understood from the description above, even if the displacement of the camera body 202 occurs during exposure, it is not determined that a blurring movement of the camera occurs so long as the displacement of the camera body 202 is practically negligible.

After setting the data on whether the frame is to be printed to "1" or "0", the set data are stored in the recording data memory 254 together with the other data such as the data on the date and time of exposure, brightness of the object and the like described above. (step #12)

After exposure of one frame, a motor 251 is driven by a motor drive signal from a motor drive circuit 252 which is controlled by the microprocessing unit 224 and the film 30 is fed by one frame length by way of a film feed mechanism 250. During feeding by one frame length, exposure data and the like stored in the recording data memory, e.g., date and time of exposure, brightness of the object, object distance, position of the camera, aspect ratio, to be or not to be printed, use of strobe light, lens opening, shutter release speed, exposure correction and whether the frame is to be printed are read out and recorded in a recording track 30g below the exposed frame 3F. (step #13)

Thus in accordance with the camera of this embodiment, printing of an exposure frame exposed with a blurring movement of the camera can be prevented.

Out of a plurality of pieces data to be printed in the recording track 30g, the data as to whether the frame is to be printed may be replaced by data instructing the number of prints required. For example, a manual print-number inputting means for manually inputting the number of prints desired is provided on the camera and the photographer may input 0, 1 or a larger figure after exposure. When 1 or a larger figure is manually input through the manual print-number inputting means for a frame whose data instructing the number of prints required has been recorded as 0, the film is rewound by one-frame length and the data is rewritten to the figure input through the manual print-number inputting means.

Further also in the camera in which the data as to whether the frame is to be printed is recorded, a manual inputting means for manually inputting whether the frame is to be printed may be provided so that whether the frame is to be printed can be input irrespective of whether blurring movement of the camera is detected. All the pictures exposed with blurring movement of the camera are not defective. For example a scene of a motor race is taken panning the camera, the picture is not defective though the displacement sensor will determine that blurring movement of the camera has occurred. In such a case, the manual inputting means is useful.

Conversely, a manual inputting means for manually cancelling the number of prints required which has been input through a suitable means when it is determined that the camera body was moved to the blur the picture.

Instruction that one print is required for each frame or each frame is to be printed may be recorded in the recording track in advance as a default. In this case, the default may be rewritten to instruction that no print is required for the frame or the frame is not to be printed when it is determined that the camera body was moved to the blur the picture. Further the default may be stored in a ROM or the like in advance and read out each time a frame is exposed.

In the second embodiment, since the LED 242 is put on when the camera body was moved to blur the picture, the photographer can know it. Generally the photographer wants to retake the same object in the next frame. When the same object is retaken, the preceding frame generally need not be printed. However when the same object is not retaken, even a defective frame is sometimes to be printed. For example, a picture of a bird about to fly cannot be taken again, so the picture is worth to print even if it defective.

Figure 17:
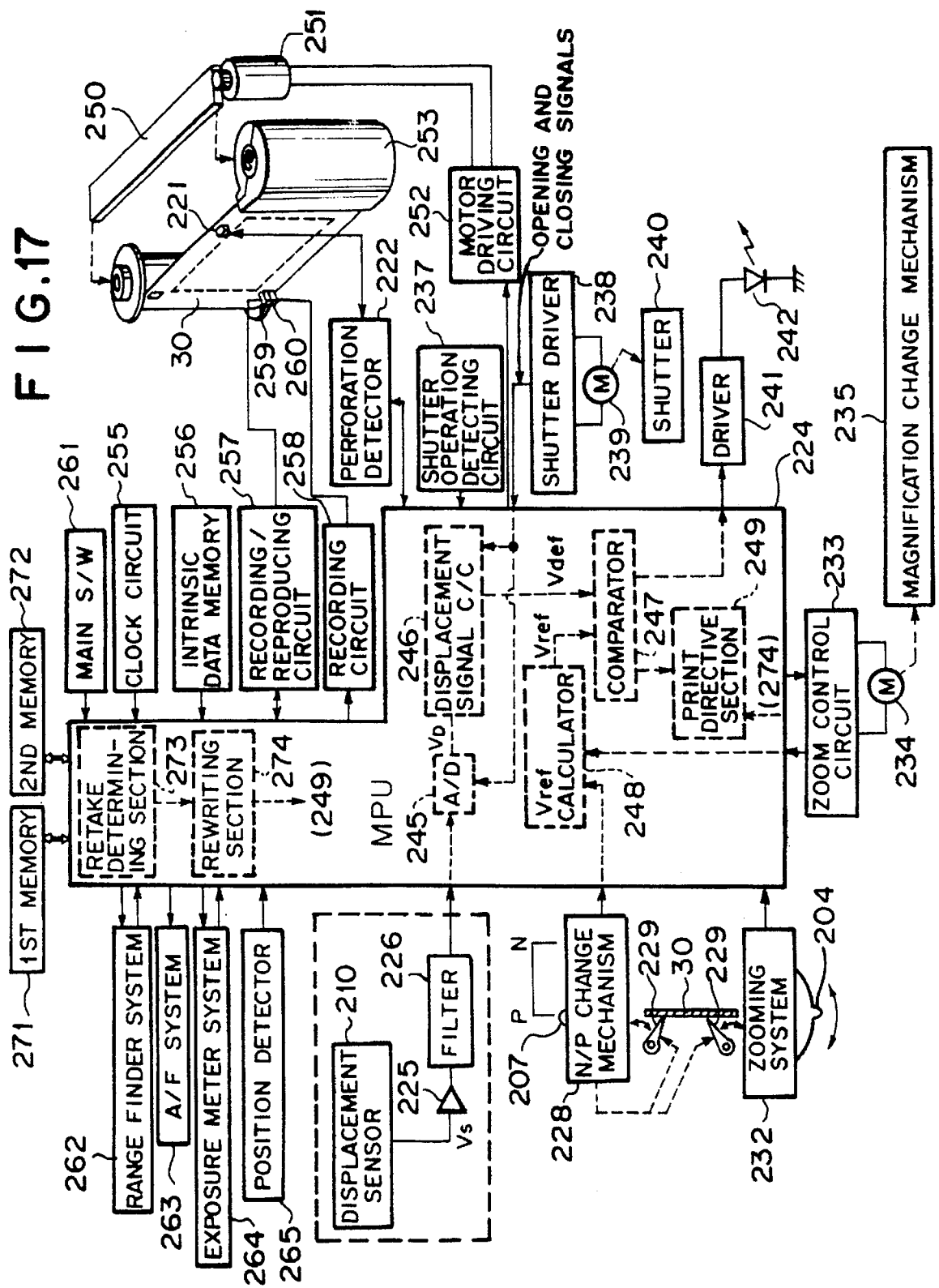
FIG. 17 is a block diagram showing the electric circuit of a photographic camera in accordance with a third embodiment of the present invention.
Figure 18:
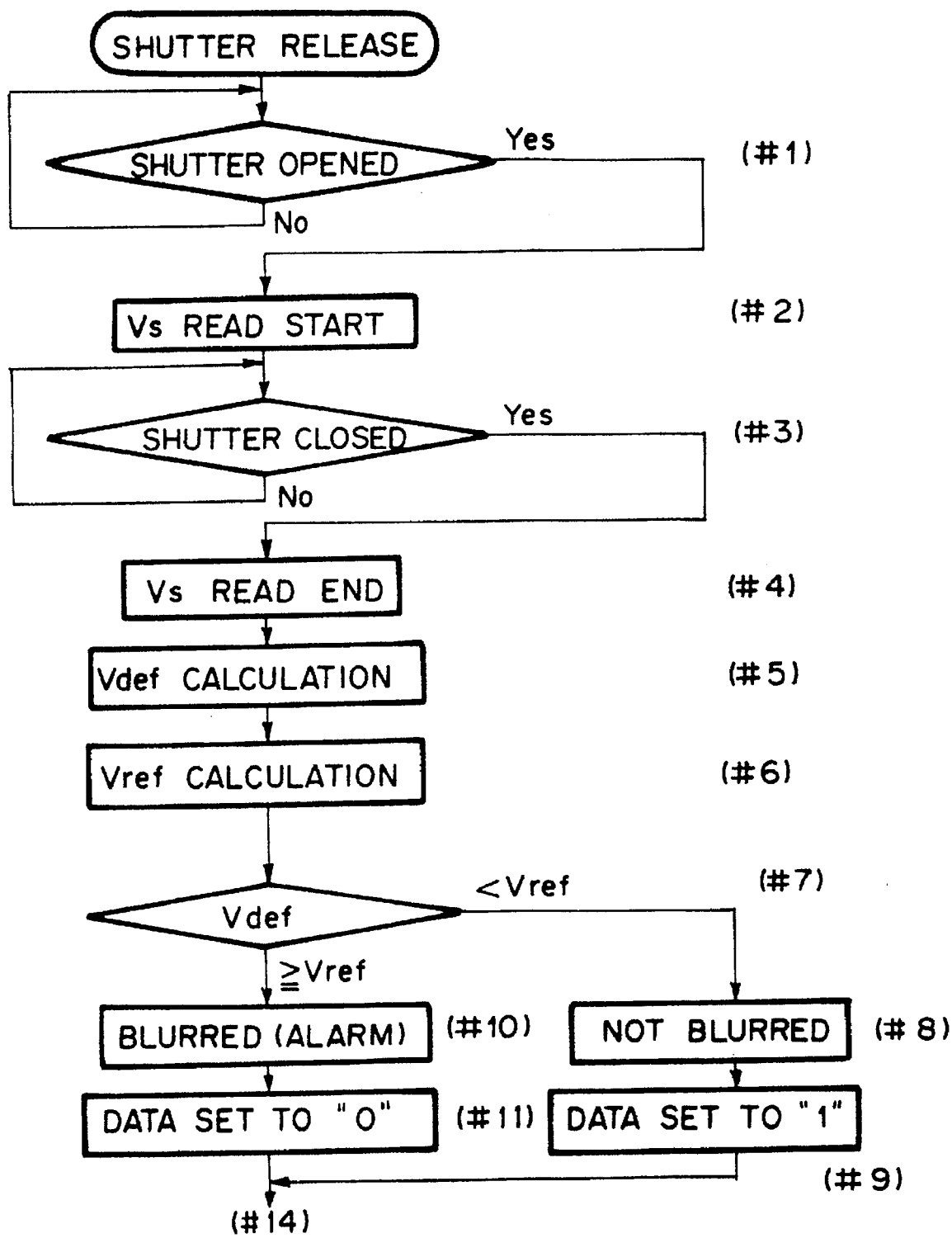
FIGS. 18 and 19 show a flow chart for illustrating the operation of the camera.
Figure 19:
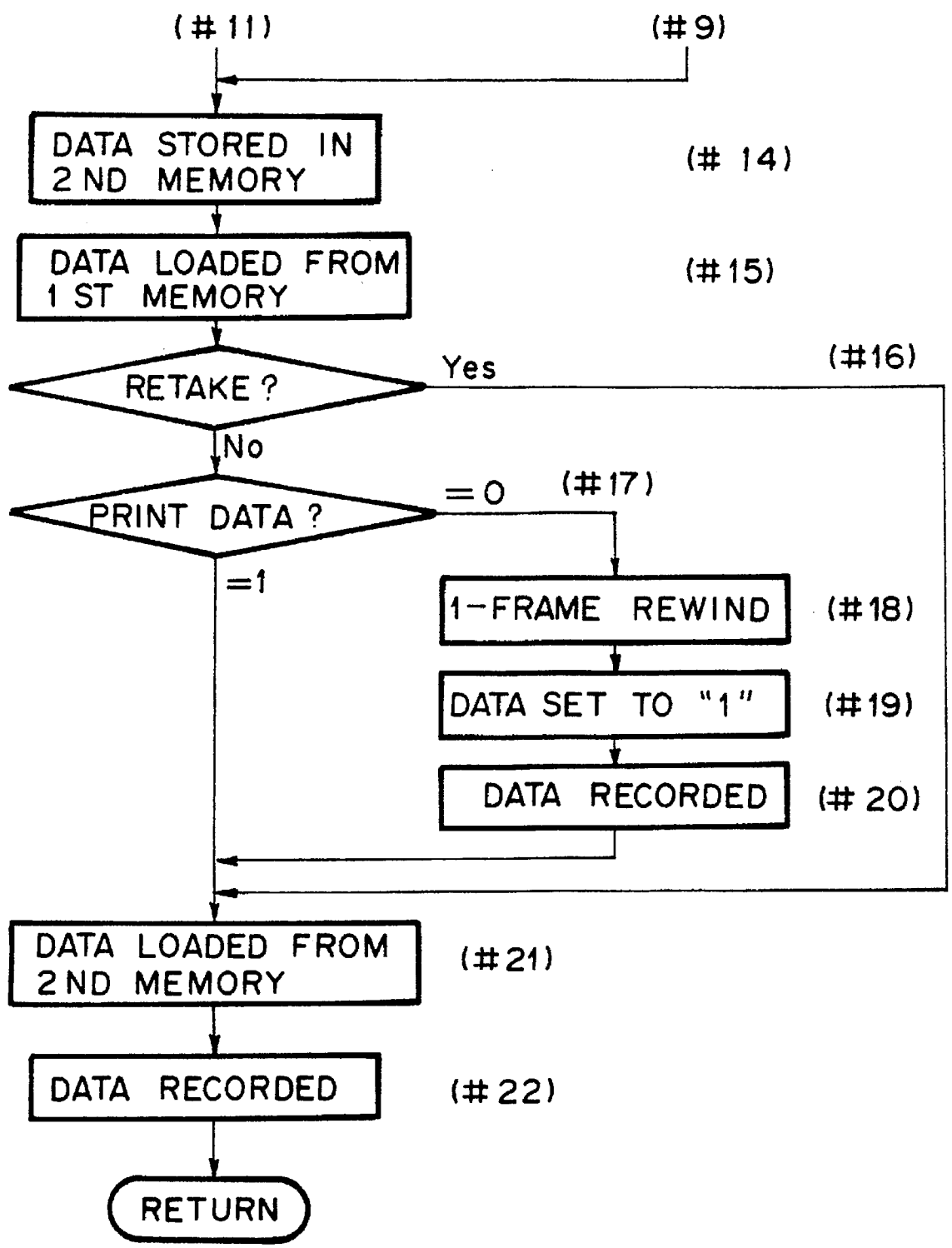

A third embodiment of the present invention will be described with reference to FIGS. 17 to 19, hereinbelow. In the third embodiment, whether or not the frame to a defective frame is a retake frame of the preceding frame is determined and when it is determined that the next frame is not a retake frame of the preceding frame, the print inhibition instruction for the preceding frame is rewritten to a print requirement instruction which requires printing of the frame.

The camera of this embodiment differs from that of the second embodiment only in the following point and accordingly the Analogous elements are given the same reference numerals and will not be described here. That is, as shown in FIG. 17, the camera of the third embodiment is provided with a pair of memories (first and second memories 271 and 272) instead of the recording data memory 254. Further a retake determining section 273 for determining whether the frame next to a frame which was determined to be defective due to blurring movement of the camera is a retake frame, and a rewriting section 274 which receives a non-retake signal from the retake determining section 273 when it determines that the next frame is not a retake frame and outputs a rewrite signal which instructs the rewriting section 274 to rewrite the data on whether the frame is to be printed (which have been "0") to "1". At the same time the rewriting section 274 outputs a reverse signal which instructs the motor drive circuit 252 to reverse the film. The first and second memories 271 and 272 are basically the same as the recording data memory 254 described above but differ from that in that they are used for alternate frames.

Figure 20:
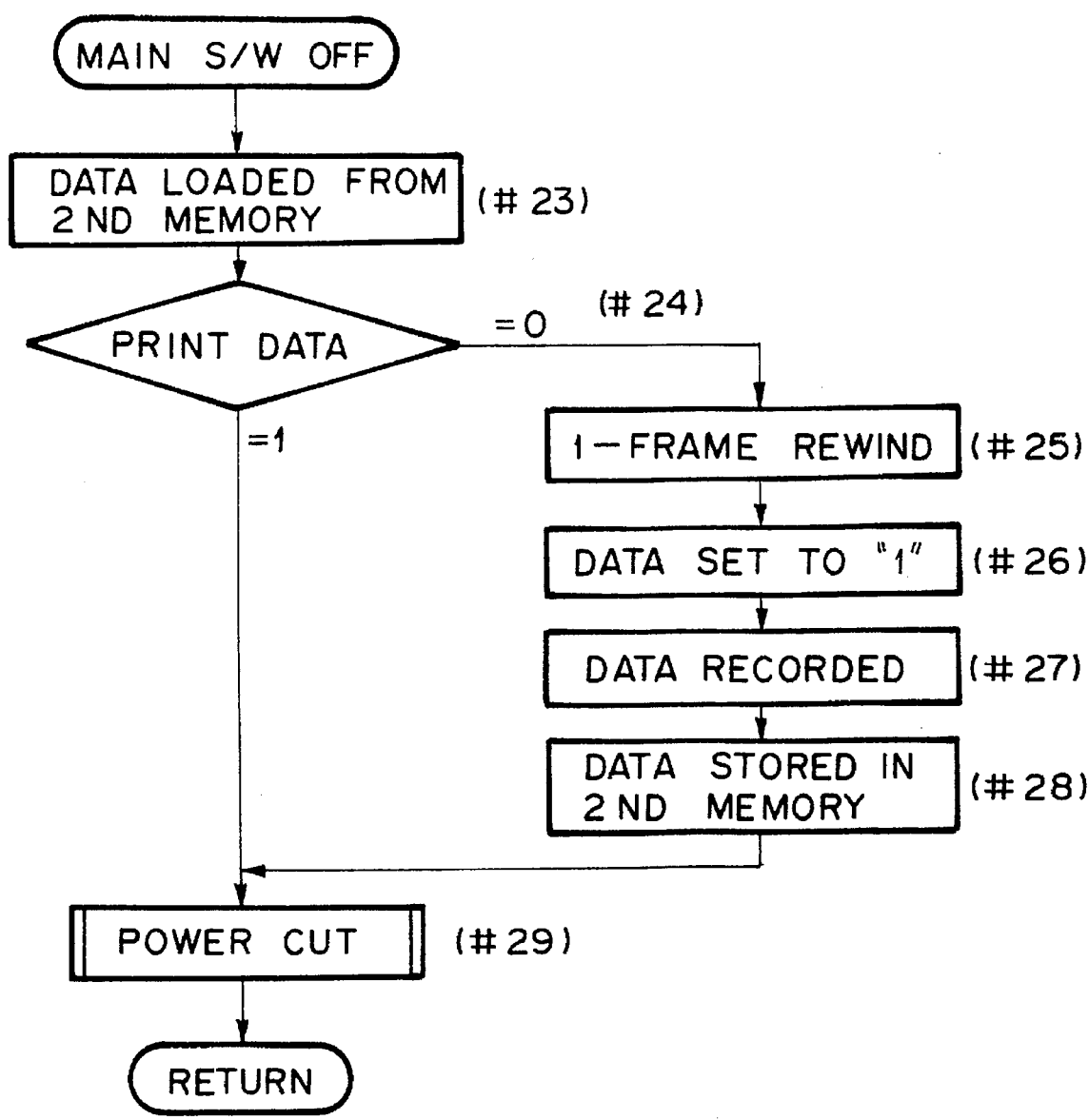
FIG. 20 shows a flow chart for illustrating the operation of the camera when the main switch is operated to cut power supply.

The operation of the third embodiment will be described with reference to the flow chart shown in FIGS. 18 and 20, hereinbelow.

Figure 16:
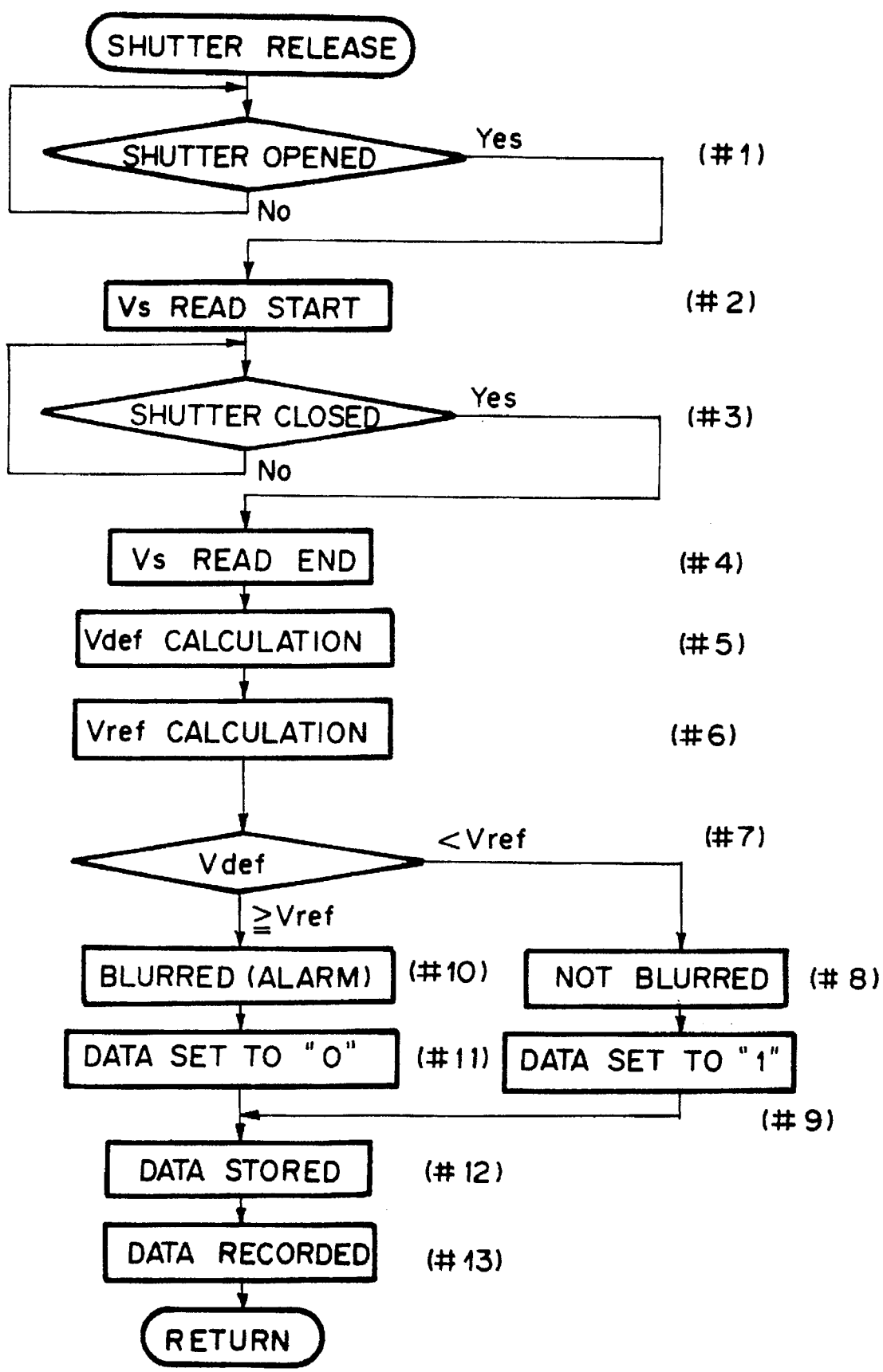
FIG. 16 is a flow chart for illustrating the operation of the camera.

In FIG. 11, steps #1 to #11 are the same as steps #1 to #11 in FIG. 16. It is assumed that the data for exposure of a preceding frame which has been recorded in the recording track 30g for the frame has been stored in the first memory 271.

That is, when the shutter button 209 is depressed, the shutter is opened and at the same time a shutter opening signal is input into an A/D convertor 245 in the microprocessing unit 224. (step #1) Thereafter the shutter is closed and at the same time a shutter closing signal is input into the A/D convertor 245. (step #3) The A/D convertor 245 reads signal voltages Vs from the filter circuit 226 at regular sampling intervals from the receipt of the shutter opening signal to the receipt of the shutter closing signal and converts the signal voltages Vs to digital signal voltages Vd. (steps #2 to #4) The digital signal voltages Vd are successively in a displacement signal calculating circuit 246. The displacement signal calculating circuit 246 calculates the difference between the highest and the lowest of digital signal voltages Vd input and inputs the difference into a comparator 247 as an absolute displacement signal Vdef. (step #5) The absolute displacement signal Vdef represents the amplitude of vibration of the magnet 218.

A reference value calculator 248 calculates a reference value Vref on the basis of a frame size signal from a frame size change mechanism 228 and a zoom position signal from the zoom control circuit 233. (step #6)

The comparator 247 compares the absolute displacement signal Vdef with the reference value Vref (step #7) and when the former is not smaller than the latter, the comparator 247 outputs an alarm signal and a print inhibition signal. The alarm signal is input into the LED driver 241 and the LED 242 is put on. (step #10) The print inhibition signal is input into a print directive section 249. The print directive section 249 sets the data on whether the frame is to be printed to "0" upon receipt of the print inhibition signal. (step #11) When the frame is not to be printed, the data on whether the frame is to be printed may be kept unwritten instead of setting it to "0".

On the other hand when it is determined in step #7 that the absolute displacement signal Vdef is smaller than the reference value Vref, no alarm signal is output and a print prompting signal is input into the print directive section 249. The print directive section 249 sets the data on whether the frame is to be printed to "1" upon receipt of the print prompting signal. (steps #8 and #9)

After setting the data on whether the frame is to be printed to "1" or "0", the set data are stored in the second memory 272 together with the other data such as the data on the date and time of exposure, brightness of the object and the like described above. (step #14)

Then the data for the preceding frame are read out from the first memory 271 and input into the retake determining section 273 under the control of the microprocessing unit 224. (step #15) The retake determining section 273 compares the data for the preceding frame and the data for the frame just exposed (the data stored in the second memory 272 and determines whether the frame just exposed is a retake frame of the preceding frame. (step #16)

When it is determined that the frame just exposed is a retake frame of the preceding frame, the film 30 is fed by one frame length by way of the film feed mechanism 250 while exposure data and the like stored in the second memory 272 including whether the frame is to be printed are read out (step #21) and recorded in a recording track 30g below the exposed frame 3F. (step #22)

When it is determined that the frame just exposed is not a retake frame of the preceding frame, it is determined whether the data as to whether the preceding frame is to be printed read out from the first memory 271 are "0" or "1". (step #17) When it is determined that the data as to whether the preceding frame is to be printed read out from the first memory 271 are "1", the film 30 is fed by one frame length by way of the film feed mechanism 250 while exposure data and the like stored in the second memory 272 including whether the frame is to be printed are read out (step #21) and recorded in a recording track 30g below the exposed frame 3F. (step #22)

When it is determined in step #17 that the data as to whether the preceding frame is to be printed read out from the first memory 271 are "0", the retake determining section 273 outputs a rewrite signal to the rewriting section 274. Upon receipt of the rewrite signal, the rewriting section 274 outputs a reverse signal which instructs the motor drive circuit 252 to reverse the film by one-frame length, whereby the preceding frame is positioned in the exposure position. (step #18)

The rewriting section 274 further outputs a rewrite signal which instructs the print directive section 249 to rewrite the data on whether the frame is to be printed (which have been "0") to "1". (step #19) After the data are so rewritten, the film 30 is fed by one frame length by way of the film feed mechanism 250 while exposure data and the like stored in the first memory 271 including whether the frame is to be printed are recorded in a recording track 30g below the preceding frame 3F. (step #20)

Thereafter the film 30 is fed by another one-frame length (corresponding to the frame just exposed) by way of the film feed mechanism 250 while exposure data and the like stored in the second memory 272 including whether the frame is to be printed are read out (step #21) and recorded in a recording track 30g below the just exposed frame 3F. (step #22)

Thus in the camera of this embodiment, when a blurred frame is not retaken in the next frame, it can be instructed that the blurred frame is to be printed.

That the next frame is not a retake frame of the preceding frame may be determined, for instance, by determining whether at least one of the following conditions, (1) to (5), is satisfied.

(1) The ratio of the distance to the object upon exposure of the blurred frame and the distance to the object upon exposure of the next frame is not smaller than a predetermined value or the difference therebetween is not smaller than a predetermined value.

(2) The ratio of the brightness of the object of the blurred frame to that of the object of the next frame is not smaller than a predetermined value or the difference therebetween is not smaller than a predetermined value.

(3) The time from the end of exposure of the blurred frame to the start of exposure of the next frame is not shorter than a predetermined time.

(4) The position of the camera at the time the blurred frame was exposed differs from that at the time the next frame was exposed or is to be exposed by an amount not smaller than a predetermined value.

(5) The aspect ratio of the blurred frame differs from that of the next frame.

Further it may be determined that the next frame is not a retake frame of the preceding frame when the main switch 261 of the camera was turned off after the displacement sensor 210 detected blurring movement of the camera during exposure of one frame and before the next frame was exposed.

The process of determining that the next frame is not a retake frame of the preceding frame on the basis of the fact that the main switch 261 of the camera was turned off after the displacement sensor 210 detected blurring movement of the camera during exposure of one frame and before the next frame was exposed will be described with reference to the flow chart shown in FIG. 20, hereinbelow.

When the main switch 261 is operated to cut power supply, the data on the last frame stored in the second memory 272 are read out and input into the retake determining section 273 under the control of the microprocessing unit 224. (step #23) The retake determining section 273 determines that retake will not be effected soon since the main switch 261 was operated to cut power supply, and determines whether the data as to whether the last frame is to be printed are "1" or "0" (step #24) When it is determined that the data are "1", power supply is cut with the data kept as they are. (step #29)

When it is determined that the data are "0", the retake determining section 273 outputs a rewrite signal to the rewriting section 274. That is, since that the main switch 261 was operated to cut power supply means that retake will not be effected, the last frame should be printed even if it is blurred. Upon receipt of the rewrite signal, the rewriting section 274 outputs a reverse signal which instructs the motor drive circuit 252 to reverse the film by one-frame length, whereby the last frame is positioned in the exposure position. (step #25)

The rewriting section 274 further outputs a rewrite signal which instructs the print directive section 249 to rewrite the data on whether the frame is to be printed (which have been "0") to "1" (step #26) After the data are so rewritten, the film 30 is fed by one frame length by way of the film feed mechanism 250 while recording the data in a recording track 30g below the last frame 3F together with the other data read out from the second memory 272. (step #27) The data read out from the second memory 272 are stored in the second memory 272 (step #28) and then power supply is cut. (step #29)

What is claimed is:

1. A photographic camera for exposing a frame of photographic film, the camera comprising:

recording means for recording, in a predetermined area of the film, a print development instruction for the frame, finger resting detecting means for detecting a photographer's finger resting on an undesired location of the camera during exposure of the frame under strobe light, and for producing a finger resting detection signal in response to said detection, and recording control means for receiving the finger resting detection signal and, in response thereto, for controlling the recording means to record the print development instruction.

2. A photographic camera as defined in claim 1 in which said recording control means causes the recording means to record data representing that the strobe light was not properly operated during exposure of the frame when the recording control means receives a finger resting detecting signal from the finger resting detecting means.

3. A photographic camera as defined in claim 1 in which said recording means records data representing whether the strobe light was operated is recorded, and the recording control means causes the recording means to record the data representing that the strobe light was not operated instead of the data representing that the strobe light was operated when the recording control means receives a finger resting detecting signal from the finger resting detecting means.

4. The camera as set forth in claim 1, wherein said undesired location of said finger is one of a strobe window, a light projecting window, a light receiving window, an exposure meter window, or a taking lens of said camera.

5. A photographic camera for exposing a frame of photographic film, the camera comprising recording means for recording on the film one of:
    a print inhibition instruction which indicates whether the frame is to be printed, and
    information on the number of prints required,
  blur detecting means for detecting that the camera was moved so as to blur the picture during exposure of the frame, and for producing a blur detecting signal in response to the detection, and
  prompting means for receiving the blur detecting signal and, in response thereto, for prompting the recording means to record the print inhibition instruction.

6. A photographic camera as defined in claim 5 further comprising a retake determining means which determines whether or not the next frame is a retake frame of the preceding frame and a rewriting means which causes the recording means to rewrite the print inhibition instruction for the preceding frame to a print requirement instruction which requires printing of the frame when the retake determining means determines that the next frame is not a retake frame of the preceding frame.

7. A photographic camera as defined in claim 6 in which said retake determining means determines that the next frame is not a retake frame of the preceding frame when at least one of the following conditions (1) the main switch of the camera was turned off after the blur detecting means detected that the camera was moved to blur the picture during exposure of one frame and before the next frame was exposed;

(2) the ratio of the distance to the object upon exposure of the blurred frame and the distance to the object upon exposure of the next frame is not smaller than a predetermined value or the difference therebetween is not smaller than a predetermined value;

(3) the ratio of the brightness of the object of the blurred frame and that of the object of the next frame is not smaller than a predetermined value or the difference therebetween is not smaller than a predetermined value;

(4) the time from the end of exposure of the blurred frame to the start of exposure of the next frame is not shorter than a predetermined time, (5) the position of the camera at the time the blurred frame was exposed differs from that at the time the next frame was exposed or is to be exposed by an amount not smaller than a predetermined value; and (6) the aspect ratio of the blurred frame differs from that of the next frame is satisfied.

8. A photographic camera as defined in claim 5 further comprising a manual input means for manually inputting an instruction on whether each frame is to be printed or on the number of prints required independently from the prompting means.

9. A photographic camera as defined in claim 6 further comprising a manual input means for manually inputting an instruction on whether each frame is to be printed or on the number of prints required independently from the prompting means.

10. A photographic camera as defined in claim 7 further comprising a manual input means for manually inputting an instruction on whether each frame is to be printed or on the number of prints required independently from the prompting means.

* * * * *